US011698510B2

(12) United States Patent
Han et al.

(10) Patent No.: US 11,698,510 B2
(45) Date of Patent: Jul. 11, 2023

(54) IMAGING APPARATUS AND IMAGE SENSOR INCLUDING THE SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Amir Arbabi, Pasadena, CA (US); Andrei Faraon, Pasadena, CA (US); Sungwoo Hwang, Seoul (KR); Jangwoo You, Seoul (KR); Byounglyong Choi, Seoul (KR); Hyeonsoo Park, Suwon-si (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 249 days.

(21) Appl. No.: 16/800,468

(22) Filed: Feb. 25, 2020

(65) Prior Publication Data

US 2020/0249429 A1 Aug. 6, 2020
US 2023/0148437 A9 May 11, 2023

Related U.S. Application Data

(63) Continuation-in-part of application No. 15/923,554, filed on Mar. 16, 2018, now Pat. No. 10,942,333, (Continued)

(30) Foreign Application Priority Data

Jan. 12, 2016 (KR) .................. 10-2016-0003672

(51) Int. Cl.
*G02B 9/12* (2006.01)
*G02B 9/14* (2006.01)
(Continued)

(52) U.S. Cl.
CPC ............... *G02B 9/12* (2013.01); *G02B 1/002* (2013.01); *G02B 3/08* (2013.01); *G02B 5/1876* (2013.01);
(Continued)

(58) Field of Classification Search
CPC .. G02B 9/12; G02B 13/0035; G02B 13/0055; G02B 2207/101; G02B 9/14; G02B 9/34;
(Continued)

(56) References Cited

U.S. PATENT DOCUMENTS 5,086,338 A 2/1992 Usui
8,755,131 B2 6/2014 Kuo
(Continued)

FOREIGN PATENT DOCUMENTS

KR 10-2005-0050049 A 5/2005
KR 1020070009768 A 1/2007
KR 10-2008-0068373 A 7/2008

OTHER PUBLICATIONS

Office Action dated Jul. 31, 2017 issued by the U.S. Patent and Trademark Office in U.S. Appl. No. 15/134,885.
(Continued)

*Primary Examiner* — Mustak Choudhury
(74) *Attorney, Agent, or Firm* — Sughrue Mion, PLLC

(57) ABSTRACT

Provided an imaging apparatus including a first optical device, a second optical device disposed such that light transmitted through the first optical device is incident on the second optical device, and a third optical device disposed such that light transmitted through the second optical device is incident on the third optical device, wherein at least one of the first optical device, the second optical device, and the third optical device includes a plurality of nanostructures, and heights of at least two nanostructures of the plurality of nanostructures are different from each other.

22 Claims, 20 Drawing Sheets

Related U.S. Application Data which is a continuation of application No. 15/134,885, filed on Apr. 21, 2016, now Pat. No. 9,946,051.

(60) Provisional application No. 62/151,108, filed on Apr. 22, 2015.

(51) Int. Cl.

| | | |
|---|---|---|
| *G02B 13/00* | (2006.01) | |
| *G02B 13/18* | (2006.01) | |
| *G02B 9/10* | (2006.01) | |
| *G02B 5/18* | (2006.01) | |
| *G02B 3/08* | (2006.01) | |
| *G02B 1/00* | (2006.01) | |
| *G02B 27/00* | (2006.01) | |
| *H04N 23/55* | (2023.01) | |

(52) U.S. Cl.
CPC ............ *G02B 9/10* (2013.01); *G02B 9/14* (2013.01); *G02B 13/003* (2013.01); *G02B 13/0035* (2013.01); *G02B 13/0055* (2013.01); *G02B 13/18* (2013.01); *G02B 27/0025* (2013.01); *H04N 23/55* (2023.01); *H05K 999/99* (2013.01); *G02B 2207/101* (2013.01)

(58) Field of Classification Search
CPC ... G02B 9/60; G02B 9/62; G02B 9/64; G02B 13/004; G02B 13/0045; G02B 13/18; G02B 27/0025; G02B 5/1809; G02B 5/1842; G02B 5/188; G02B 5/1895; G02B 1/002; G02B 1/041; H04N 5/2254; H04N 5/3696

See application file for complete search history.

(56) References Cited

U.S. PATENT DOCUMENTS

| | | | |
|---|---|---|---|
| 8,921,473 B1* | 12/2014 | Hyman | C08K 3/04 |
| | | | 524/495 |
| 9,946,051 B2 | 4/2018 | Han et al. | |
| 2007/0091472 A1* | 4/2007 | Alkemper | G02B 5/1895 |
| | | | 359/796 |
| 2012/0328240 A1 | 12/2012 | Ma et al. | |
| 2013/0229704 A1 | 9/2013 | Smolyaninov | |
| 2013/0335827 A1 | 12/2013 | Brueckner et al. | |
| 2014/0153114 A1 | 6/2014 | Suzuki | |
| 2016/0133762 A1 | 5/2016 | Blasco Claret | |
| 2017/0082263 A1* | 3/2017 | Byrnes | F21K 9/64 |
| 2020/0025893 A1* | 1/2020 | Jang | G01S 7/4817 |

OTHER PUBLICATIONS

Office Action dated Mar. 16, 2018 issued by the U.S. Patent and Trademark Office in U.S. Appl. No. 15/923,554.

Office Action dated Jul. 9, 2019 issued by the U.S. Patent and Trademark Office in U.S. Appl. No. 15/923,554.

Caroline Perry, "Perfect colors, captured with one ultra-thin lens", Harvard John A. Paulson School of Engineering and Applied Science, Feb. 19, 2015, Total 8 pages.

Communication dated Feb. 8, 2023, issued by the Korean Intellectual Property Office in Korean English Patent Application No. 10-2016-0003672.

* cited by examiner

IMAGING APPARATUS AND IMAGE SENSOR INCLUDING THE SAME

CROSS-REFERENCE TO RELATED APPLICATION

This application is a continuation-in-part of U.S. application Ser. No. 15/923,554, filed on Mar. 16, 2018, which is a continuation of U.S. application Ser. No. 15/134,885, filed on Apr. 21, 2016, which issued as U.S. Pat. No. 9,946,051 and claims priority from U.S. Provisional Application No. 62/151,108, filed on Apr. 22, 2015 in the U.S. Patent and Trademark Office, and Korean Patent Application No. 10-2016-0003672, filed on Jan. 12, 2016 in the Korean Intellectual Property Office, the disclosures of which are incorporated herein in their entireties by reference.

This invention was made with government support under Grant No. W911NF-14-1-0345 awarded by the ARO-US Army. The government has certain rights in the invention.

BACKGROUND

1. Field

Apparatuses and systems consistent with exemplary embodiments relate to imaging apparatuses and image systems including the same.

2. Description of the Related Art

Optical sensors including semiconductor sensor arrays are frequently used in mobile devices, wearable devices, and the Internet of Things. Although such devices are ideally small, it is difficult to reduce the thicknesses of imaging apparatuses included in such sensor arrays.

Conventional imaging apparatuses using optical lenses include many optical lenses in order to remove chromatic aberration and geometric aberration and ensure a desired f-number. Since the optical lenses must have predetermined shapes in order to perform their respective functions, there is a limitation in reducing the thicknesses of such conventional imaging apparatuses.

SUMMARY

One or more exemplary embodiments provide imaging apparatuses that may be designed to be small and image systems including such imaging apparatuses.

Additional exemplary aspects and advantages will be set forth in part in the description which follows and, in part, will be apparent from the description, or may be learned by practice of the presented embodiments According to an aspect of an example embodiment, there is provided an imaging apparatus including a first optical device, a second optical device disposed such that light transmitted through the first optical device is incident on the second optical device, and a third optical device disposed such that light transmitted through the second optical device is incident on the third optical device, wherein at least one of the first optical device, the second optical device, and the third optical device includes a plurality of nanostructures, and heights of at least two nanostructures of the plurality of nanostructures are different from each other.

A difference in the heights of the at least two nanostructures may be equal to or less than $2\lambda$, where $\lambda$ is a wavelength of the light.

The heights of the at least two nanostructures may be equal to or greater than $\lambda/2$ and equal to or less than $3\lambda$, where $\lambda$ is a wavelength of the light.

The plurality of nanostructures may be disposed in a multilayer structure.

The multilayer structure may include a first layer and a second layer, and the plurality of nanostructures may include a plurality of lower nanostructures included in the first layer and a plurality of upper nanostructures included in the second layer.

The plurality of lower nanostructures and the plurality of upper nanostructures may be disposed to face each other, and a central axis of at least one of the plurality of lower nanostructures and a central axis of at least one of the plurality of upper nanostructures are offset.

A distance between the plurality of lower nanostructures and the plurality of upper nanostructures in a height direction may be greater than $\lambda/2$, where $\lambda$ is a wavelength of the light.

A shape distribution of the plurality of lower nanostructures and a shape distribution of the plurality of upper nanostructures may be determined such that a performance index for each location of the imaging apparatus is different from performance indices of other locations of the imaging apparatus, and the shape distribution may include a shape, a width, a height, and an arrangement of each of the plurality of nanostructures.

The shape distribution of the plurality of lower nanostructures and the shape distribution of the plurality of upper nanostructures may be determined such that non-uniformity of focusing performances for locations of the imaging apparatus compensate each other.

At least two nanostructures of the plurality of nanostructures may have widths that are different from each other.

The first optical device may be a refractive optical lens, and each of the second optical device and the third optical device may be a thin lens including the plurality of nanostructures.

The plurality of nanostructures of the second optical device and the plurality of nanostructures of the third optical device may be configured to offset a chromatic aberration of the second optical device and a chromatic aberration of the third optical device with each other.

The first optical device may be configured to offset at least one of a geometric aberration and a chromatic aberration of at least one of the second optical device and the third optical device.

Each of the plurality of nanostructures may include at least one material selected from a group consisting of crystalline silicon (c-Si), polycrystalline silicon (p-Si), amorphous silicon (a-Si), III-V compound semiconductors, SiC, $TiO_2$, and SiN.

According to an aspect of an example embodiment, there is provided an image system including at least one imaging apparatus, and at least one light measurer corresponding, respectively, to each imaging apparatus of the at least one imaging apparatus, each light measurer of the at least one light measurer being configured to measure light incident on an image plane of a corresponding imaging apparatus of the at least one imaging apparatus, wherein the at least one imaging apparatus includes a first optical device, a second optical device disposed such that light transmitted through the first optical device is incident on the second optical device, and a third optical device disposed such that light transmitted through the second optical device is incident on the third optical device, and wherein at least one of the first optical device, the second optical device, and the third optical device includes a plurality of nanostructures, and at least two nanostructures of the plurality of nanostructures have heights that are different from each other.

A difference in the heights of the at least two nanostructures may be less than or equal to $2\lambda$, where $\lambda$ is a wavelength of the light.

A height of each of the at least two nanostructures may be equal to or great than $\lambda/2$ and equal to or less than $3\lambda$, where $\lambda$ is a wavelength of the light.

The plurality of nanostructures may be disposed in a multilayer structure.

The multilayer structure may include a first layer and a second layer, and the plurality of nanostructures may include a plurality of lower nanostructures included in the first layer and a plurality of upper nanostructures included in the second layer.

The plurality of lower nanostructures and the plurality of upper nanostructures may be disposed to face each other, and a central axis of at least one of the plurality of lower nanostructures and a central axis of at least one of the plurality of upper nanostructures may be offset.

The plurality of lower nanostructures and the plurality of upper nanostructures in a height direction may be greater than $\lambda/2$, where $\lambda$ is a wavelength of the light.

A shape distribution of the plurality of lower nanostructures and a shape distribution of the plurality of upper nanostructures may be determined such that a performance index for each location of the imaging apparatus is different from performance indices of other locations of the imaging apparatus, and the shape distribution includes a shape, a width, a height, and an arrangement of each of the plurality of nanostructures.

The shape distribution of the plurality of lower nanostructures and the shape distribution of the plurality of upper nanostructures may be determined such that non-uniformity of focusing performances for locations of the at least one imaging apparatus compensate each other.

At least two nanostructures of the plurality of nanostructures may have widths that are different from each other.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
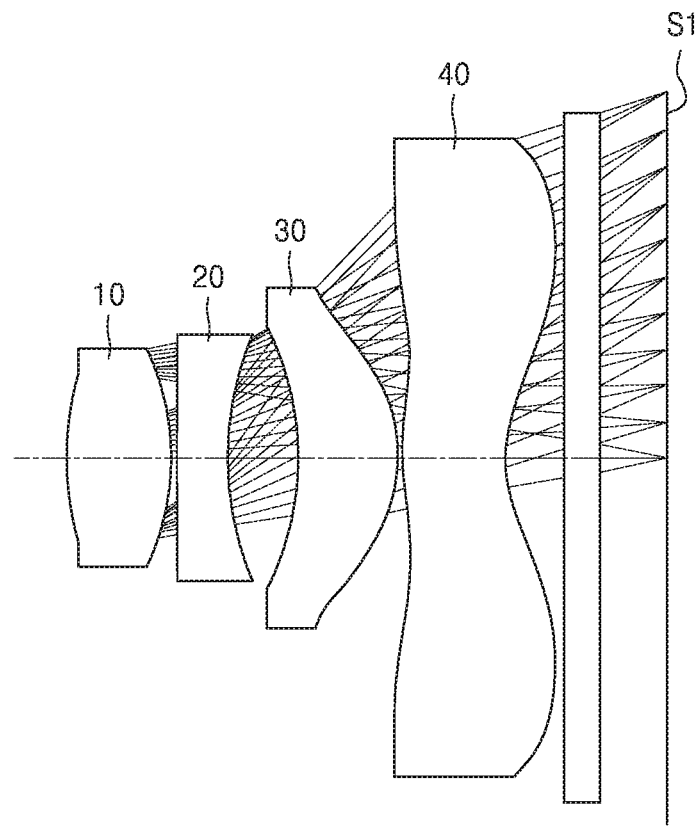
FIG. 1 is a view of a related art imaging apparatus including refractive optical lenses.

The inventive concept will now be described more fully with reference to the accompanying drawings, in which exemplary embodiments of the invention are shown. In the drawings, the same reference numerals denote the same elements and sizes of components may be exaggerated for clarity. The inventive concept may have different forms and should not be construed as limited to the exemplary embodiments set forth herein. For example, it will also be understood that when a layer is referred to as being "over" another layer or a substrate, it can be directly on the other layer or the substrate, or intervening layers may also be present therebetween.

As used herein, the term "and/or" includes any and all combinations of one or more of the associated listed items. Expressions such as "at least one of," when preceding a list of elements, modify the entire list of elements and do not modify the individual elements of the list.

FIG. 1 is a view of a related art imaging apparatus including optical lenses 10, 20, 30, and 40. The optical lenses 10, 20, 30, and 40 are refractive lenses.

Each of the optical lenses 10, 20, 30, and 40 may include a material having a refractive index different from that of a medium outside the optical lens. A path of light passing through each of the optical lenses 10, 20, 30, and 40 may be changed by changing at least one of a refractive index of the lens, and the shape of the lens, for example, the curvature of a surface of the lens. Also, a light-converging point on an image plane S1, as formed by light transmitted through the imaging apparatus, may be changed by appropriately changing the shapes of the optical lenses 10, 20, 30, and 40 and/or intervals between the optical lenses 10, 20, 30, and 40.

However, since a refractive index of a refractive optical lens is different for different wavelengths of light, chromatic aberration may occur. Also, the light-converging points formed by light transmitted through an optical lens may have geometric aberration in which a focus is distorted. For example, geometric aberration in which a plane on which a focus is formed is not flat but curved, may lead to field curvature.

In order to control chromatic aberration and geometric aberration, an imaging apparatus may be designed by combining lenses having various shapes. However, in this case, since a number of optical lenses having various shapes are included in the imaging apparatus, the thickness of the imaging apparatus may be increased. Alternately, when the thickness of the imaging apparatus is reduced, that is, an f-number of the lenses is reduced, the ratio of a thickness to a diameter of each of the lenses may be increased. The f-number of a lens is a number obtained by dividing a focal length of the lens by a diameter of the lens, and the luminance of an image projected by the lens is dependent, in part, on the f-number. Clearly, if the thickness of each lens in an imaging apparatus is increased, there is limit in the degree to which the total thickness of the imaging apparatus may be reduced.

In order to reduce the size of an imaging apparatus, the thickness of the imaging apparatus has to be reduced and the f-number of each of the lenses included in the imaging apparatus has to be reduced to a predetermined value or less. Since there is a limit by using refractive index-based lenses, a new thin-lens may be used to achieve these objectives.

Figure 2:
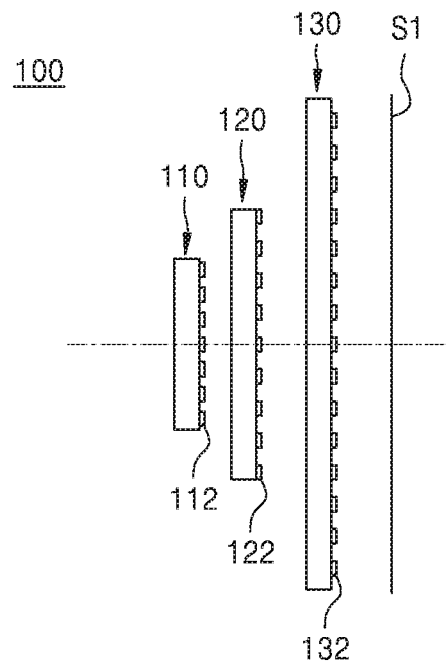
FIG. 2 is a view of an imaging apparatus according to an exemplary embodiment.

FIG. 2 is a view of an imaging apparatus 100 according to an exemplary embodiment.

Referring to FIG. 2, the imaging apparatus 100 according to an exemplary embodiment may include a first optical device 110 configured to focus incident light so that the location of a focal point of the incident light is dependent on the incident angle of the light, a second optical device 120 configured to focus light having been transmitted through the first optical device 110 so that the light transmitted through the second optical device 120 has a focal length that is dependent on the location of the focal point of the light transmitted through the first optical device 110, and a third optical device 130 configured so that light transmitted through the second optical device 120 is focused onto focal points on the image plane S1.

At least one of the first through third optical devices 110, 120, and 130 may be a thin-lens including a substrate on which plurality of nanostructures are provided. The term 'thin-lens' refers to an optical device that alters a path of light transmitted therethrough by adjusting a phase delay and a phase delay distribution of the transmitted light according to nanostructures disposed on a surface of a substrate. In contrast, as discussed above, an optical lens determines a path of light transmitted therethrough according to the shape and refractive index of the optical lens. Accordingly, a degree to which the thickness of a thin-lens array can be reduced is not limited in the way that the thickness of an optical lens array is limited, and a thin-lens array may be quite thin.

The nanostructures may have a sufficiently greater refractive index than that of a medium outside the nanostructures and may have a transmittance and a transmission phase dependent on a shape and a material of the nanostructures. Light incident on nanostructures is coupled in one or more waveguide modes of the nanostructures and resonates within the nanostructures. Amplitudes and phases of light transmitted through or reflected from the nanostructures may be determined by such resonance characteristics. In order to form a desired optical device (e.g. a thin-lens), nanostructures may be arranged, and the shapes of the nanostructures may be determined in accordance with a transmission phase and amplitude distribution (e.g., a converging or diverging wave front) of the desired optical device.

Although nanostructures 112, 122, and 132 are respectively illustrated on surfaces of substrates of the first through third optical devices 110, 120, and 130 facing the image plane S1 in FIG. 2, the present exemplary embodiment is not limited thereto. For example, the nanostructures 112, 122, and 132 may be provided on surfaces of substrates of the first through third optical devices 110, 120, and 130 on which light is incident. Alternatively, the nanostructures 112, 122, and 132 may be provided on both surfaces of substrates of the first through third optical devices 110, 120, and 130.

Also, although the first through third optical devices 110, 120, and 130 of FIG. 2 are all thin-lenses, the present exemplary embodiment is not limited thereto. For example, one or two of the first through third optical devices 110, 120, and 130 may be designed as thin-lenses, and the remaining one or more lenses may be optical lens(es).

Figure 3:
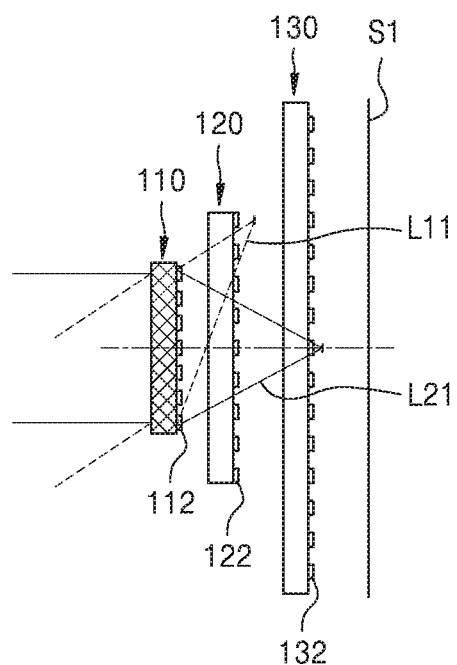
FIG. 3 is a view illustrating a state in which incident light passes through a first optical device according to an exemplary embodiment.

Light reflected from an object (not shown) may be incident on the first optical device 110. FIG. 3 is a view illustrating a state in which incident light is transmitted through the first optical device 110 according to an exemplary embodiment.

Referring to FIG. 3, the first optical device 110 may focus incident light so that the focal point of the incident light is dependent on the incident angle of the incident light. For example, second incident light L21 is incident in a direction parallel to an arrangement direction in which the first through third optical devices 110, 120, and 130 are arranged (e.g. a direction normal to planes of each of the first through third optical devices 110, 120, and 130—i.e. a left-to-right direction as illustrated in FIG. 3), and the second incident light L21 may therefore be directed to a focal point along a line parallel to the arrangement direction which passes through the center of the second optical device 120, as shown in FIG. 3. In contrast, first incident light L11, which is incident on the first optical device 110 in a direction oblique to the arrangement direction may be directed to a focal point spaced away from a line which passes through the center of the second optical device 120. The first optical device 110 may include the plurality of nanostructures 112 provided on a surface of a substrate thereof, such that the path of light incident thereon is re-directed.

The nanostructures 112 may be provided on a surface of a substrate of the first optical device 110 facing the image plane S1. However, the present exemplary embodiment is not limited thereto. Alternatively, the nanostructures 112 may be provided on a surface of a substrate on which incident light is incident. Alternatively, the nanostructures 112 may be provided on both surfaces of a substrate of the first optical device 110.

The nanostructures 112 provided on a surface of a substrate of the first optical device 110 may be designed so that the first optical device 110 functions as a lens having positive refractive power. By selecting the shapes and heights of and the intervals between the nanostructures 112, the first optical device 110 may be made to change a path of light incident thereon in the same way that a lens having positive refractive power changes a path of light incident thereon. Thus, since the first optical device 110 has positive refractive power and is arranged substantially parallel to the second and third optical devices 120 and 130, the first incident light L11, incident in a direction oblique to the arrangement direction of the first through third optical devices 110, 120, and 130—i.e. incident at a non-normal angle with respect to a plane of the first optical device 110, may be directed to a focal point at off a principal axis of the first optical device 110. The principal axis of the first optical device is illustrated by the long- and short-dashed line of FIG. 3. Also, the second incident light L21, incident in a direction normal to the plane of the first optical device 110, may be directed to a focal point along the principal axis of the first optical device 110.

Light transmitted through the first optical device 110 may be incident on the second optical device 120. The second optical device 120 may focus light incident thereon so that the light transmitted through the second optical device 120 has a focal length dependent on the position on the second optical device 120 on which the light is incident.

Figure 4:
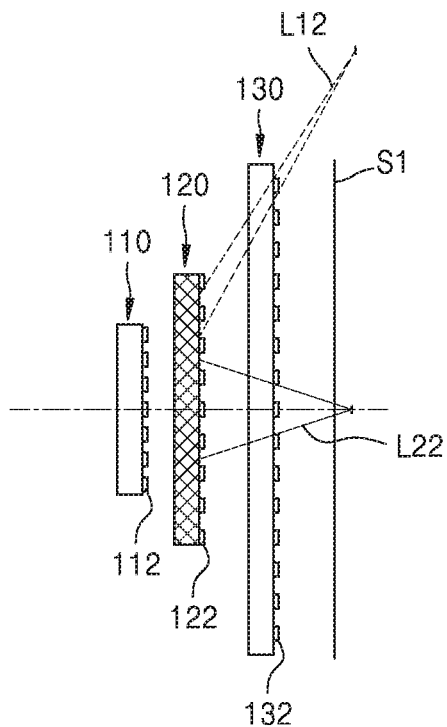
FIG. 4 is a view illustrating a state in which light passes through a second optical device according to an exemplary embodiment.

FIG. 4 is a view illustrating a state in which light passes through the second optical device 120 according to an exemplary embodiment.

Referring to FIG. 4, the second optical device 120 may focus light so that the focal lengths of the light depend on the position on the second optical device on which the light is incident. For example, second light L22 is incident on a center of the second optical device 120 and is focused to have a relatively short focal length. In contrast, first light L12 is incident on an edge of the second optical device 120 and is focused to have a relatively long focal length. Since the second optical device 120 focuses incident light so that light incident on an edge has a longer focal length, an optical path difference according to an incident angle may be compensated for. The second optical device 120 may include the plurality of nanostructures 122 provided on a surface of a substrate thereof in order to refract incident light.

The nanostructures 122 may be provided on a surface of a substrate the second optical device 120 facing the image plane S1. However, the present exemplary embodiment is not limited thereto. Alternatively, the nanostructures 122 may be provided on a surface a substrate of the second optical device 120 on which light is incident. Alternatively, the nanostructures 122 may be provided on both surfaces of a substrate of the second optical device 120.

The nanostructures 122 provided on a surface of the substrate of the second optical device 120 may be designed so that the second optical device 120 functions as a lens having negative refractive power. By selecting the shapes and heights of and the intervals between the nanostructures 122, the second optical device 120 may be made to change a path of light incident thereon, like a lens having negative refractive power. Thus, since the second optical device 120 has negative refractive power and is arranged substantially parallel to the first and third optical devices 110 and 130, the first incident light L12, incident in a direction oblique to the arrangement direction of the first through third optical devices 110, 120, and 130 (incident at a non-normal angle with respect to a plane of the first optical device 120) may be focused to have a relatively long focal length. Also, the second incident light L22, incident in a direction normal to the plane of the second optical device 120, may be focused to have a relatively short focal length.

Light having been transmitted through the second optical device 120 may be incident on the third optical device 130. The third optical device 130 may change a path of light having passed through the second optical device 120 to form a focal point on the image plane S1. In this case, the image plane S1 may be an arbitrary plane spaced apart by a predetermined interval from the third optical device 130. The image plane S1 may be flat. However, the present exemplary embodiment is not limited thereto, and the image plane S1 may be curved.

Figure 5:
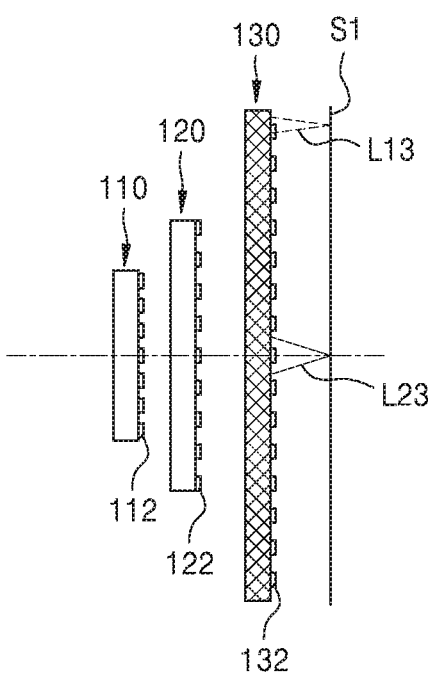
FIG. 5 is a view illustrating a state in which light passes through a third optical device according to an exemplary embodiment.

FIG. 5 is a view illustrating a state in which light passes through the third optical device 130 according to an exemplary embodiment.

Referring to FIG. 5, the third optical device 130 may be configured so that light incident on the third optical device 130 form focal points on the image plane S1. In this case, the third optical device 120 may change paths of light having passed through the third optical device 130 so that the light having passed through the third optical device 130 is incident on the image plane S1 at an angle normal to the image plane. However, the present exemplary embodiment is not limited thereto. Alternatively, light having passed through different positions on the third optical device 130 may be incident at different angles on the image plane S1.

For example, the third optical device 130 may be configured so that light incident toward an edge of the third optical device 130 has a transmission phase distribution having a short focal length. That is, first light L13 incident on an edge of the third optical device 130 may be focused to have a transmission phase distribution having a relatively short focal length. In contrast, second light L23 incident on a center of the third optical device 130 may be focused to have a transmission phase distribution having a relatively long focal length. Since the third optical device 130 focuses light so that the light has different focal lengths of the third optical device 130 dependent on the position on the third optical device 130 on which the light is incident. The light having passed through the third optical device 130 may form imaging focal points on the image plane S1. The third optical device 130 may include the plurality of nanostructures 132 provided on a surface of a substrate thereof in order to change a travel direction of incident light.

The nanostructures 132 may be provided on a surface of a substrate of the third optical device 130 facing the image plane S1. However, the present exemplary embodiment is not limited thereto. Alternatively, the nanostructures 132 may be provided on a surface of a substrate of the third optical device 130 on which light is incident. Alternatively, the nanostructures 132 may be provided on both surfaces of a substrate of the third optical device 130.

The nanostructures 132 provided on a surface of a substrate of the third optical device 130 may be designed so that the third optical device 120 functions as a lens having positive refractive power. By adjusting the shapes and heights of and the intervals between the nanostructures 132, the third optical device 130 may be made to deflect light at each location, like a lens having positive refractive power. Since the third optical device 130 has a positive refractive power, the first incident light L13 incident in a direction oblique to the arrangement direction of the first through third optical devices 110, 120, and 130 may be focused by a relatively short focal length of the third optical device in the location where L13 is incident. Also, the second incident light L23 incident in a direction parallel to the arrangement direction of the first through third optical devices 110, 120, and 130 may be focused by a relatively long focal length of the third optical device in the location where L13 is incident.

Figure 6:
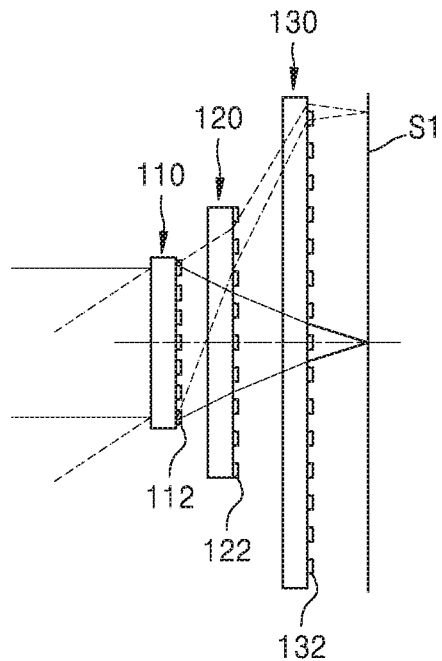
FIG. 6 is a view illustrating an entire optical path of the imaging apparatus of FIGS. 2 through 5 according to an exemplary embodiment.

FIG. 6 is a view illustrating an entire optical path of the imaging apparatus 100 of FIGS. 2 through 5 according to an exemplary embodiment.

Referring to FIG. 6, irrespective of an incident angle of incident light, as light passes through the first through third optical devices 110, 120, and 130, focal points may be formed on the image plane S1. Also, a position at which a focal point is formed on the image plane S1 may vary according to the incident angle of incident light. Accordingly, when a plurality of light-receiving units having different coordinates are provided on the image plane S1, each of the light-receiving units may correspond to a pixel.

The first through third optical devices 110, 120, and 130 may be designed to offset chromatic aberration and geometric aberration which may alter a path of light. To this end, the shapes, cross-sectional areas, heights, material compositions, and intervals of the nanostructures 112, 122, and 132 respectively included in the first through third optical devices 110, 120, and 130 may be appropriately determined.

The first through third optical devices 110, 120, and 130 are thin-lenses respectively including the nanostructures 112, 122, and 132 in FIGS. 2 through 6. However, the present exemplary embodiment is not limited thereto. For example, any two of the first through third optical devices 110, 120, and 130 may be thin-lenses and the remaining one may be an optical lens using a refractive index-based method. Alternatively, any one of the first through third optical devices 110, 120, and 130 may be a thin-lens and the remaining two may be optical lenses using a refractive index-based method.

Figure 7:
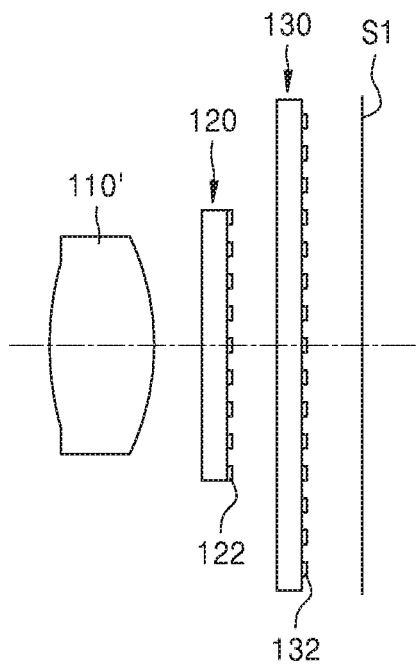
FIG. 7 is a view of an imaging apparatus according to an exemplary embodiment.

FIG. 7 is a view of the imaging apparatus 100 according to an exemplary embodiment.

Referring to FIG. 7, the first optical device 110 may be an optical device using a refractive index-based method, and the second and third optical devices 120 and 130 may be thin-lenses respectively including the nanostructures 122 and 132. The nanostructures 122 and 132 of the second and third optical devices 120 and 130 may be designed to minimize chromatic aberration that occurs in the second and third optical devices 120 and 130. To this end, shapes, cross-sectional areas, heights, material compositions, and intervals of the nanostructures 122 and 132 respectively included in the second and third optical devices 120 and 130 may be appropriately determined.

The first optical device 110 may be designed to correct at least one of chromatic aberration and geometric aberration not corrected by the second and third optical devices 120 and 130. To this end, a refractive index of the first optical device 110 may be determined by appropriately selecting a material included in the first optical device 110. Also, lens characteristics of the first optical device 110 may be adjusted by changing a surface shape and a thickness of the first optical device 110.

Figure 8:
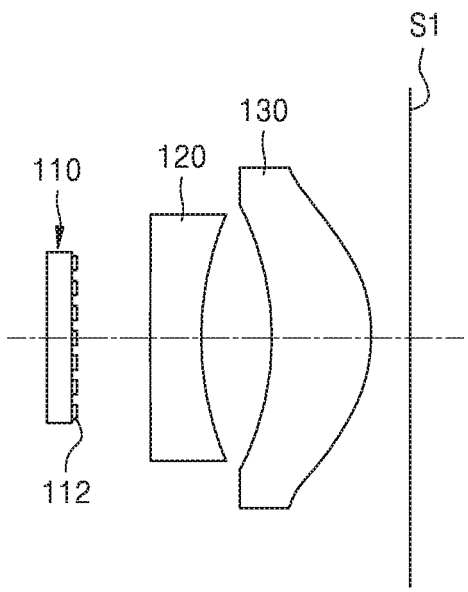
FIG. 8 is a view of an imaging apparatus according to an exemplary embodiment.

FIG. 8 is a view of the imaging apparatus 100 according to an exemplary embodiment.

Referring to FIG. 8, the first optical device 110 may be a thin-lens including the nanostructures 112, and the second and third optical devices 120 and 130 may be optical lenses using a refractive index-based method. The nanostructures 112 of the first optical device 110 may be designed to offset at least one of chromatic aberration and geometric aberration that occur in the second and third optical devices 120 and 130. To this end, shapes, cross-sectional areas, heights, material compositions, and intervals of the nanostructures 112 included in the first optical device 110 may be appropriately determined.

The first optical device 110 is separate from the second optical device 120 in FIG. 8. However, since the first optical device 110 is a thin-lens and there is no limitation in a surface shape, the first optical device 110 may be integrally formed with the second optical device 120.

Figure 9:
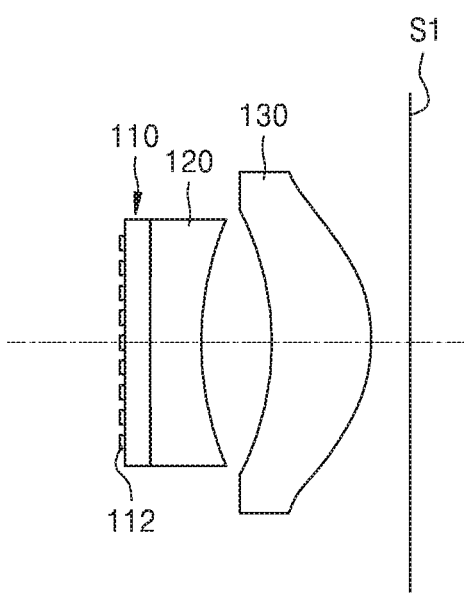
FIG. 9 is a view of an imaging apparatus according to an exemplary embodiment.

FIG. 9 is a view of the imaging apparatus 100 according to an exemplary embodiment.

Referring to FIG. 9, the first optical device 110 that is a thin-lens may be provided on a surface of the second optical device 120. Although the first optical device 110 is provided on a surface of the second optical device 120 on which light is incident in FIG. 9, the present exemplary embodiment is not limited thereto. For example, the first optical device 110 may be provided on a surface of the second optical device 120 facing the image plane S1.

When the first optical device 110 is provided on a surface of the second optical device 120 as shown in FIG. 9, since there is no interval between the first optical device 110 and the second optical device 120, a size of the imaging apparatus 100 may be reduced.

Figure 10:
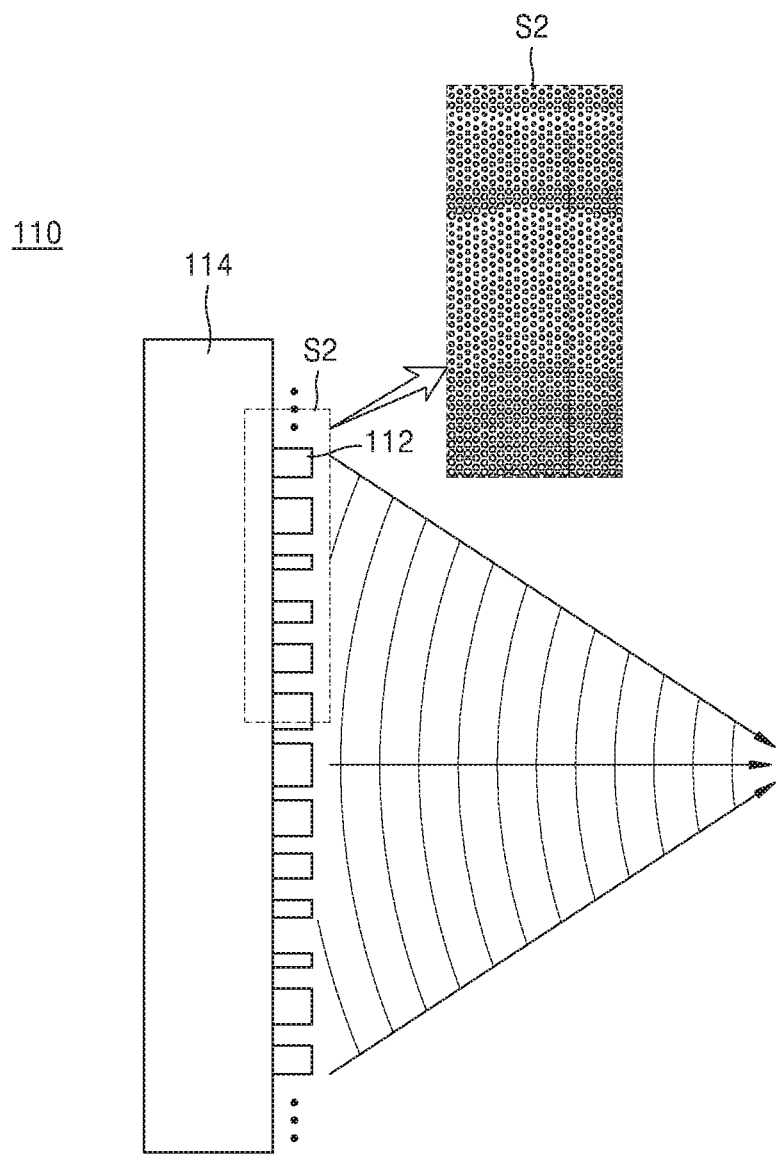
FIG. 10 is a view of a thin-lens according to an exemplary embodiment.

FIG. 10 is a view of a thin-lens described in the above according to an exemplary embodiment.

With reference to FIG. 10, exemplary embodiments of the first optical device 110 of FIGS. 2 through 6 will be explained.

Referring to FIG. 10, the first optical device 110 that is a thin-lens may include the plurality of nanostructures 112 and a substrate 114 on which the nanostructures 112 are arranged. The substrate 114 may be a support for forming the nanostructures 112. Also, a material layer (not shown) that surrounds the nanostructures 112 may be added. FIG. 10 is a conceptual view of the nanostructures 112, and actual sizes and numbers of the nanostructures 112 may be different from those shown in FIG. 10.

Referring to an alternate view of a surface S2 in FIG. 10, shapes, materials, and arrangements of the nanostructures 112 may vary according to positions on the first optical device 110. Since shapes, materials, and arrangements of the nanostructures 112 vary according to positions on the first optical device 110, travel directions of transmitted light may be changed by determining a transmission phase distribution of light according to positions on the first optical device 110.

Figure 11:
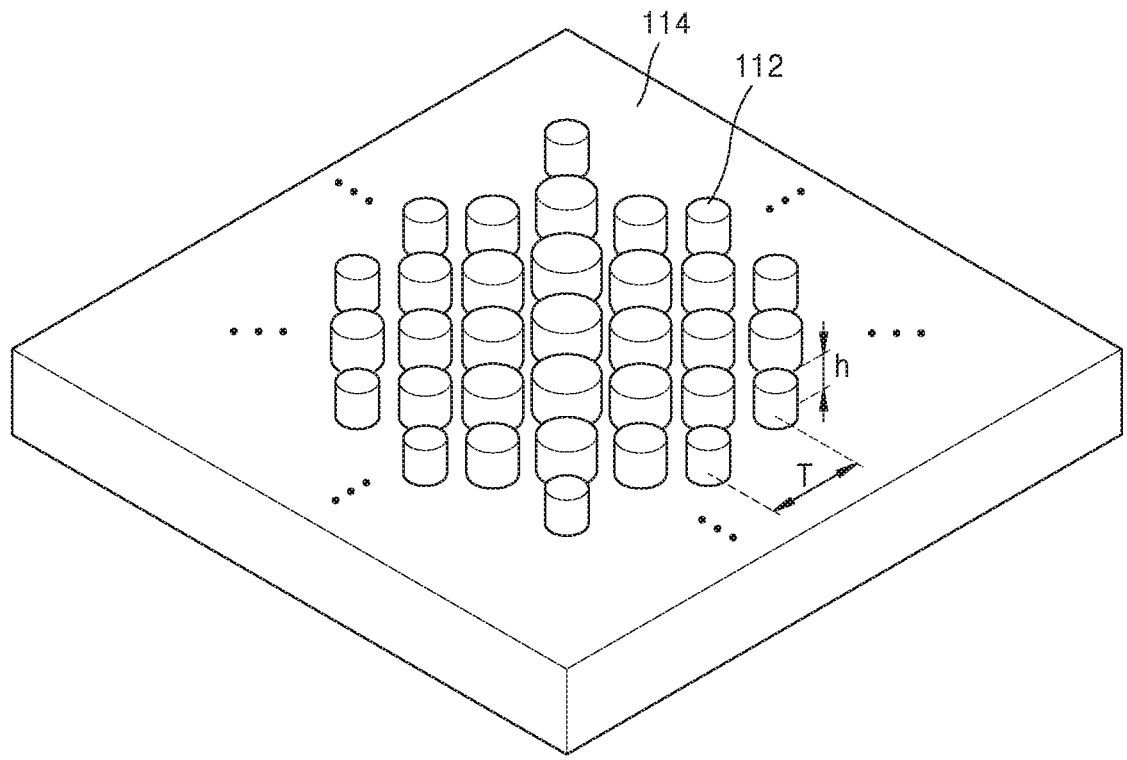
FIG. 11 is a view illustrating a part of a surface of the first optical device of FIG. 10 according to an exemplary embodiment.

FIG. 11 is a view illustrating a part of a surface of the first optical device 110 of FIG. 10 according to an exemplary embodiment.

Referring to FIG. 11, the nanostructures 112 having circular cylindrical shapes may be arranged on the substrate 114. Although the nanostructures 112 have circular cylindrical shapes in FIG. 11, the present exemplary embodiment is not limited thereto. For example, the nanostructures 112 may have any of various shapes such as polygonal prism shapes, circular cylindrical shapes, or elliptic cylindrical shapes. Alternatively, cross-sections of the nanostructures 112 may have "L"-like prism shapes.

Shapes of the nanostructures 112 may not be symmetric in a specific direction. For example, cross-sections of the nanostructures 112 may not be symmetric in a horizontal direction, to have, for example, elliptic shapes. Also, since cross-sections of the nanostructures 112 vary according to heights, shapes of the nanostructures 112 may not be symmetric in a vertical direction.

A refractive index of a material included in the nanostructures 112 may be greater (for example, by 1.5 or more) than a refractive index of materials composing the substrate 114, a material layer (not shown), which may surround the nanostructures 112 and a peripheral portion. Accordingly, the substrate 114 may include a material with a relatively low refractive index and the nanostructures 112 may include a material with a relatively high refractive index.

For example, the nanostructures 112 may include at least one of crystalline silicon (c-Si), polycrystalline silicon (poly-Si), amorphous silicon (a-Si), $Si_3N_4$, GaP, $TiOO_2$, AlSb, AlAs, AlGaAs, AlGaInP, BP, and ZnGeP2. Also, the substrate 114 may include any one of a polymer (e.g., poly(methyl methacrylate) (PMMA)), plastic, and $SiO_2$ (e.g., glass or quartz).

The first through third optical devices 110, 120, and 130 may change a direction of incident light according to a wavelength of the incident light. Accordingly, the imaging apparatus 100 may be configured so that only incident light of a predetermined wavelength range forms a focal point on the image plane S1. A wavelength that is allowed by the imaging apparatus 100 to form a focal point on the image plane S1 in a wavelength range of incident light is referred to as an operating wavelength. The operating wavelength may include, for example, a wavelength (about 650 nm) of red light, a wavelength (about 475 nm) of blue light, and a wavelength (about 510 nm) of green light. Also, the operating wavelength may include a wavelength (about 800 nm to 900 nm) of infrared light. The values are exemplary, and the operating wavelength of the imaging apparatus 100 may be set in other ways. For example, a band of wavelengths can be set as an operating wavelength range.

Once the operating wavelength is determined, the first through third optical devices 110, 120, and 130 may also be designed to correspond to the operating wavelength. For example, detailed shapes (e.g., intervals, cross-sectional shapes, or heights) and materials of the nanostructures 122, 122, and 132 respectively included in the first through third optical devices 110, 120, and 130 may be determined to correspond to the operating wavelength.

Referring back to FIG. 11, an interval T between adjacent nanostructures of the nanostructures 112 may be less than the operating wavelength of the imaging apparatus 100. For example, the interval T between the nanostructures 112 may be equal to or less than ¾ or ⅔ of the operating wavelength of the imaging apparatus 100 or may be equal to or less than ½ of the operating wavelength. A height h of each of the nanostructures 112 may be equal to or less than ⅔ of the operating wavelength. The interval T, height h and shape of the nanostructures may vary depending on the location of the nanostructures in the thin-lens.

Figure 12:
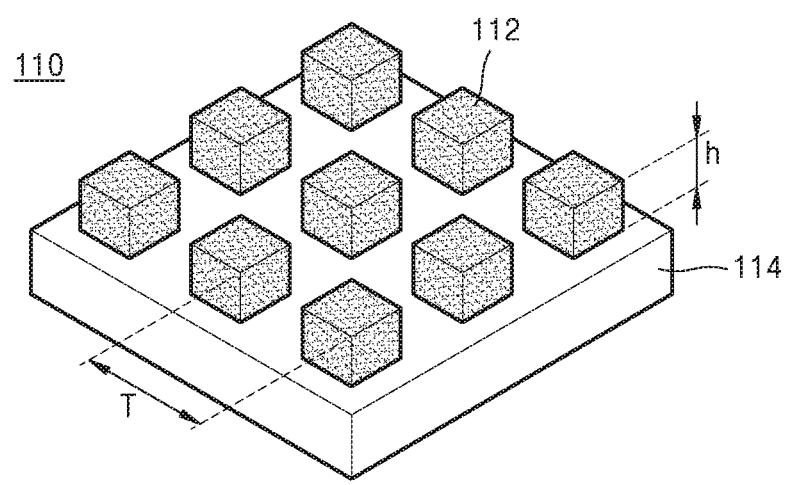
FIG. 12 is a view illustrating a surface of the first optical device of FIG. 10 according to another exemplary embodiment.

FIG. 12 is a view illustrating a surface of the first optical device 110 of FIG. 10 according to another exemplary embodiment.

Referring to FIG. 12, the nanostructures 112 having rectangular parallelepiped shapes may be arranged on the substrate 114. Although the nanostructures 112 have rectangular parallelepiped shapes in FIG. 12, the present exemplary embodiment is not limited thereto. For example, the nanostructures 112 may have any of various shapes such as polygonal prism shapes, circular cylindrical shapes, or elliptic cylindrical shapes. Alternatively, cross-sections of the nanostructures 112 may have prism shapes.

Heights and intervals of the nanostructures 112 may be determined according to an operating wavelength of the imaging apparatus 100. An interval T between adjacent nanostructures of the nanostructures 112 may be less than the operating wavelength of the imaging apparatus 100. For example, the interval T between the nanostructures 112 may be equal to or less than ¾ or ⅔ of the operating wavelength of the imaging apparatus 100, or may be equal to or less than ½ of the operating wavelength. Also, a height h of each of the nanostructures 112 may be less than the operating wavelength. For example, the height h of each of the nanostructures 112 may be equal to or less than ⅔ of the operating wavelength. The interval T, height h and shape of the nanostructures may vary depending on the location of the nanostructures in the thin-lens.

The description of the substrate 114 and the nanostructures 112 made with reference to FIGS. 11 and 12 may apply to the second and third optical devices 120 and 130. That is, when the second and third optical devices 120 and 130 are thin-lenses, the description of the nanostructures 112 made with reference to FIGS. 11 and 12 may apply to the nanostructures 122 and 132 respectively included in the second and third optical devices 120 and 130.

Figure 13:
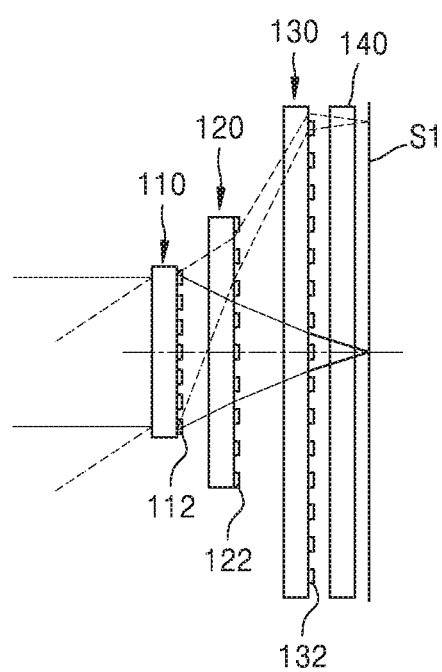
FIG. 13 is a view of the imaging apparatus according to an exemplary embodiment.

FIG. 13 is a view of the imaging apparatus 100 according to an exemplary embodiment.

In FIG. 13, a repeated explanation of the same elements or operations as those in FIGS. 1 through 12 will not be given.

Referring to FIG. 13, the imaging apparatus 100 according to an exemplary embodiment may further include an optical filter 140 configured to prevent light having a wavelength other than operating wavelength range from being incident on the image plane S1. Although the optical filter 140 is provided between the third optical device 130 and the image plane S1 in FIG. 13, a position of the optical filter 140 is not limited thereto. The optical filter 140 may be provided between the second optical device 120 and the third optical device 130 or may be provided between the first optical device 110 and the second optical device 120. Alternatively, the optical filter 140 may be provided in front of an incident surface of the optical filter 110 and may enable only light having the operating wavelength from among incident light to be incident on the first optical device 110.

The optical filter 140 may absorb or reflect light having wavelengths other than the operating wavelength range of the imaging apparatus 100 from among light incident on the optical filter 140. The optical filter 140 may prevent light having wavelengths other than the operating wavelength range from being incident as noise on the image plane S1.

Hereinafter, optical elements included in the image pickup device according to the exemplary embodiment will be described.

Figure 14:
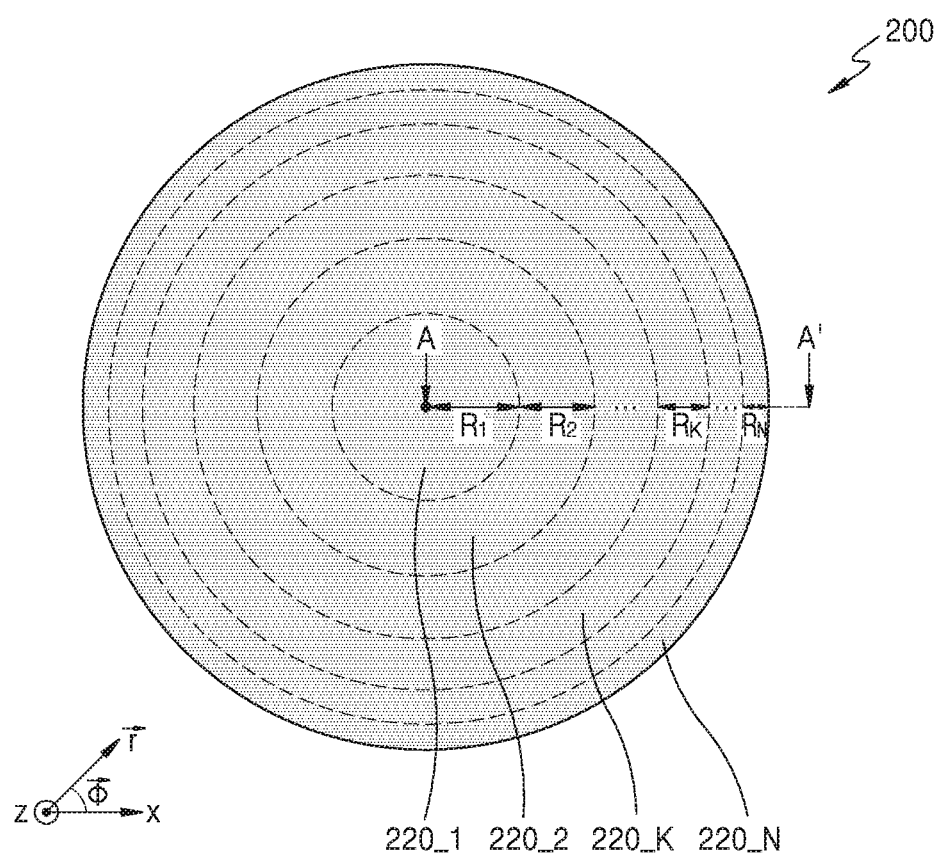
FIG. 14 is a plan view showing that an optical device according to an embodiment is divided into a plurality of regions.
Figure 15:
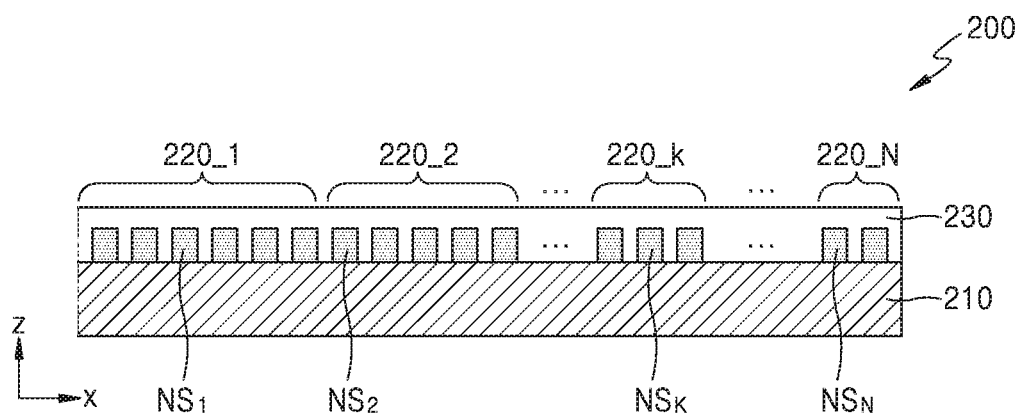
FIG. 15 is a cross-sectional view taken along line AA' of FIG. 14.

FIG. 14 is a plan view showing that a region of an optical device 200 according to an embodiment is divided into a plurality of regions. FIG. 15 is a cross-sectional view taken along line AA' of FIG. 14.

Referring to FIGS. 14 and 15, the optical device 200 may include a first region 220_1, a second region 220_2, . . . and an N-th region 220_N. The first region 220_1 may be a central region and have a circular shape, and the second region 220_2 to the N-th region 220_N may have a ring shape concentrically surrounding the first region 220_1. N may be a natural number that is equal to or greater than three. The plurality of regions are provided such that the shape, spacing, arrangement rules, etc. of the nanostructures $NS_1$ to $NS_N$ disposed in each region may be distinguished and controlled for each region. Further, the number of regions, the size of each of the regions, etc. may be determined based on optical functions and performances to be implemented by the optical device 200.

Referring to FIG. 15, the first region 220_1 includes a plurality of first nanostructures $NS_1$ two-dimensionally arranged in a radial direction and a circumferential direction. The plurality of first nanostructures $NS_1$ may be distributed according to a first rule. Here, a rule may be applied to parameters such as shape, size (width, height), spacing, array shape, etc. of the k-th nanostructure $NS_k$ ($1 \leq k \leq N$), and these parameters may be constant within the same area, or may be expressed as a function of position.

The second region 220_2 includes a plurality of second nanostructures $NS_2$ that are two-dimensionally arranged in the radial direction and the circumferential direction. The plurality of second nanostructures $NS_2$ may be distributed according to a second rule.

The N-th region 220_N includes a plurality of N-th nanostructures $NS_N$ two-dimensionally arranged in the radial direction and the circumferential direction. The plurality of N-th nanostructures $NS_N$ may be distributed according to an N-th rule.

Shapes, widths, heights, and spacing of the nanostructures $NS_k$ ($1 \leq k \leq N$) included in each of the plurality of regions are shown as constant, and a k-th nanostructure $NS_k$ provided in the k-th region 120_k may be set according to a k-th rule. Not all of the first to N-th rules may be different from each other. For example, some or all of the first to N-th rules may be identical to each other.

The substrate 210 and the nanostructure $NS_k$ may include materials having different refractive indices. A refractive index difference between the refractive index of the substrate 210 and a refractive indices of the nanostructure $NS_k$ may be greater than or equal to 0.5. The refractive index of the nanostructure $NS_k$ may be greater than that the refractive index of the substrate 210, but embodiments are not limited thereto. For example, the refractive index of the nanostructure $NS_k$ may be less than the refractive index of the substrate 210.

The protective layer 230 is a layer covering and protecting the plurality of nanostructures $NS_k$ as a whole, and may include a material having a refractive index different from refractive indices of the nanostructures $NS_k$. A difference between the refractive index of the protective layer 230 and the refractive index of the nanostructure $NS_k$ may be greater than or equal to 0.5. The protective layer 230 may include a material having a refractive index less than refractive indices of the nanostructure $NS_k$. In this case, the protective layer 230 may be omitted. However, embodiments are not limited thereto, and the refractive index of the protective layer 230 may be greater than refractive indices of the nanostructure $NS_k$.

The substrate 210 may include any one of glass (fused silica, BK7, etc.), quartz, polymer (PMMA, SU-8, etc.), and plastic, or may include a semiconductor substrate. The nanostructure $NS_k$ may include at least one of c-Si, p-Si, a-Si, and a Group III-V compound semiconductor (GaP, GaN, GaAs, etc.), SiC, $TiO_2$, and SiN. The protective layer 230 may include a polymer material, such as SU-8, PMMA, or a low refractive index material, such as $SiO_2$.

In this way, the nanostructure $NS_k$ having a refractive index difference from a surrounding material may change the phase of light passing through the nanostructure $NS_k$ based on the phase delay caused by geometric dimensions of sub-wavelengths of the nanostructures $NS_k$. The degree of the phase delay may be determined by a detailed shape dimension, an arrangement form, etc. of the nanostructure $NS_k$. Various optical functions may be achieved by appropriately setting the degree of phase delay occurring in each of the plurality of nanostructures $NS_k$.

The number of the plurality of regions and a rule applied thereto may be arranged such that the optical element 200 shows refractive power with respect to light of a predetermined wavelength band. For example, the predetermined wavelength band may be a visible light wavelength band. The refractive power may be a positive refractive power, such as a convex lens or a negative refractive power, such as a concave lens. An absolute value of the refractive power may be increased by increasing the number of regions. A sign of refractive power is determined according to the size distribution trend in each region, and the trend may be opposite to each other based on the optical element 200 having a positive refractive power or a negative refractive power. For example, the optical element 200 may have a positive refractive power when the size of the nanostructure $NS_k$ decreases in a radial direction in each region, and the optical element 200 may have a negative refractive power when the size of the nanostructure $NS_k$ increases in the radial direction.

The number of the plurality of regions and a rule applied thereto may be set such that the optical element 200 has a negative Abbe number. Since a general refractive lens, for example, a refractive lens having a curved shape on an entrance or exit surface of light to exhibit refractive power has a positive Abbe number, there is a limit in controlling dispersion to a desired degree.

Abbe's number is related to the dispersion shown by the optical element 200. Chromatic dispersion is due to the property that a general medium exhibits different refractive indices for different wavelengths, and Abbe's number $V_d$ is defined as follows in Equation 1.

$$V_d = (n_d - 1)/(n_F - n_C) \quad \text{[Equation 1]}$$

In Equation 1, nd, nF, and nC respectively represent the refractive index with respect to light of d line (587.5618 nm), C line (656.2816 nm), and F line (486.1327 nm).

If the color dispersion due to the refractive index difference according to a wavelength is large, the refractive power acting on incident light varies according to a color of the incident light, and thus chromatic aberration occurs. In order to compensate for such chromatic aberration, when composing an imaging lens, a method of using two lenses having a large difference in Abbe's number together is generally used. Since the optical element 200 according to an exemplary embodiment may have a negative Abbe number, it may more effectively compensate for chromatic aberration generated in another lens by being employed in an imaging lens. Here, the negative Abbe's number is an example, but embodiments are not limited thereto. The number of the plurality of regions and a rule applied thereto may be set such that the optical element 200 has an Abbe number of a desired value for appropriate chromatic aberration compensation.

Widths of the plurality of regions may be different from each other. For example, a radius of the first region 220_1 having a circular shape may be greater than a radial width of the ring-shaped second region 220_2. Also, the width of the ring shape may gradually decrease from the third region 220_3 to the N-th region 220_N. However, this is an example and embodiments are not limited thereto.

A plurality of first nanostructures $NS_1$, a plurality of second nanostructures $NS_2$, . . . a plurality of N-th nanostructure $NS_N$ may be arranged as a whole to have polar symmetry. For example, the plurality of nanostructures $NS_k$ ($1 \leq k \leq N$) may be arranged to have rotational symmetry of a predetermined angle with a Z axis as a rotation axis. In this case, the shape of the nanostructure $NS_k$ at each position or a distance between the nanostructures $NS_k$ adjacent to each other may be expressed as a function of r irrespective of φ. Here, r is a radius in polar coordinates, and φ is an angle between a reference line in the polar coordinates.

According to an example embodiment, the plurality of first nanostructure $NS_1$, the plurality of second nanostructures $NS_2$, . . . the plurality of N-th nanostructures $NS_N$ may be arranged to have polar symmetry in the k-th region 120_k to which each nanostructure $NS_k$ belongs. For example, the first nanostructures $NS_1$ disposed in the first region 120_1 may be arranged to have rotational symmetry of a predetermined angle $\Delta\varphi_1$, and the second nanostructures $NS_2$ disposed in the second region 120_2 may have rotational symmetry of an angle $\Delta\varphi_2$ different from the predetermined angle. An angle $\Delta\varphi_k$ of rotational symmetry may become smaller as k becomes larger, for example, a region farther from the center of the optical element 200. However, this is an example. The angle of rotational symmetry may not be different in all regions, but may be different in at least two regions.

Figure 16:
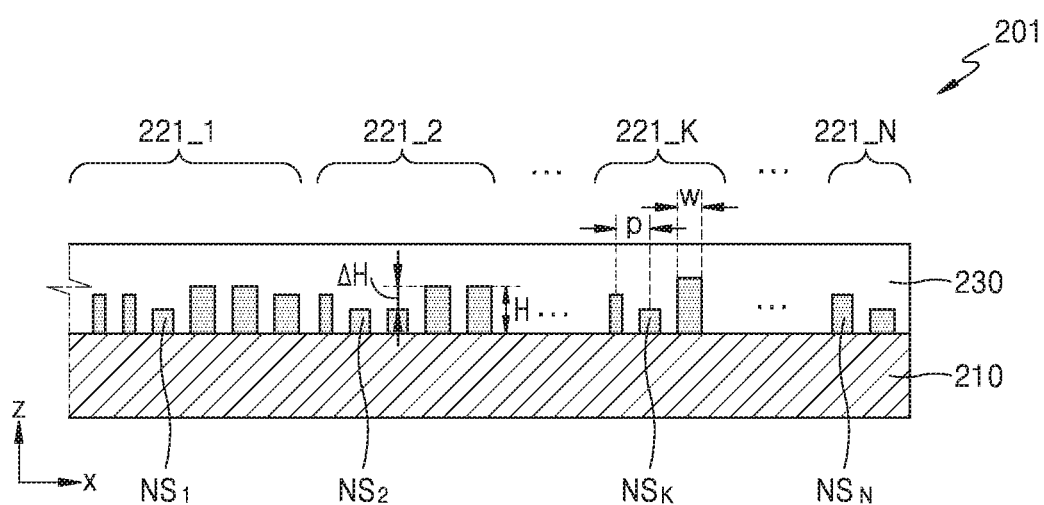
FIG. 16 is a cross-sectional view of a schematic structure of an optical device according to another exemplary embodiment.
Figure 17:
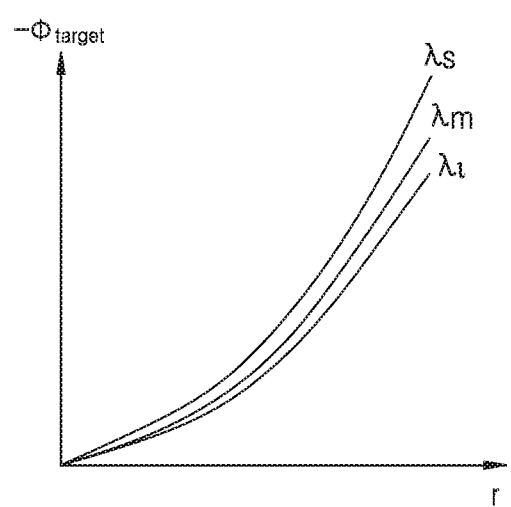
FIG. 17 is a graph illustrating a target phase for each wavelength to be satisfied by nanostructures included in respective regions of the optical device of FIG. 16.

FIG. 16 is a cross-sectional view of a schematic structure of an optical device 201 according to an exemplary embodiment. FIG. 17 is a graph conceptually showing a target phase for each wavelength to be satisfied by the nanostructures included in each region of FIG. 16.

FIG. 16 is a view corresponding to a cross-sectional view taken along line AA' in the plan view of FIG. 14. The optical device 201 may include a first region 221_1, a second region 221_2, . . . and an N-th region 221_N. The optical element 201 may define an arrangement rule of nanostructures $NS_k$ in each of the k-th regions 221_k (1≤k≤N) to exhibit refractive power with respect to light of a predetermined wavelength band. The optical element 201 according to the exemplary embodiment is different from the above-described optical element 200 in that heights H different from each other are applied to at least two nanostructures $NS_k$ included in the same region among the first region 221_1 and the second region 221_2, . . . to the N-th region 221_N. In FIG. 16, nanostructures $NS_k$ having different heights are provided in all regions, however, embodiments are not limited thereto. For example, in some regions, the heights of the nanostructures $NS_k$ may be the same.

A height difference $\Delta H$ of the at least two nanostructures $NS_k$ may be 2λ or less with respect to a wavelength λ within a predetermined wavelength band. The height H of the second nanostructure $NS_2$ may be in a range of λ/2≤H≤3λ with respect to the wavelength λ, within a predetermined wavelength band.

Based on the plurality of nanostructures $NS_k$ being formed to have different heights from each other, chromatic aberration, dispersion according to a wavelength in applying refractive power to light of a wider wavelength band, may be more easily controlled.

In order to express refractive power with respect to incident light, a predetermined arrangement rule may be applied to the nanostructure $NS_k$ disposed in each of the plurality of regions 221_k. The nanostructure $NS_k$ having a refractive index difference from a surrounding material may change the phase of light passing through the nanostructure $NS_k$. Here, the phase change to be implemented by the nanostructure $NS_k$ may be a target phase. For each region, a target phase $\varphi_{target}$ as shown in FIG. 17 may be set. The target phase $\varphi_{target}$ is set to represent a phase change range of 2π based on the center wavelength $\lambda_m$ in a given region in the form as shown in FIG. 14, and in this regard, the plurality of regions 221_k may be a 2π zone.

As shown in FIG. 17, the target phase $\varphi_{target}$ is slightly different for light having different wavelengths $\lambda_1$, $\lambda_m$, and $\lambda_s$. The different wavelengths $\lambda_1$, $\lambda_m$, and $\lambda_s$ may be, for example, red, green, and blue wavelength bands. In order to implement desired target phases for light having a predetermined wavelength, a rule defining the shape, size, and arrangement of the nanostructures $NS_k$ disposed in the plurality of 2π zones may be determined. Hereinafter, a shape distribution may include shape, size, arrangement, etc. together. The degree of changing the target phase $\varphi_{target}$ is related to the dispersion Δφ, and the wavelength range including $\lambda_1$, $\lambda_m$, and $\lambda_s$ described above is related to a bandwidth BW. The shape condition of each of the nanostructures $NS_k$ that may implement a dispersion Δφ within a desired range for a desired bandwidth BW may be set from a pre-prepared phase-dispersion map. The phase-dispersion map may be created by a method in which the nanostructures are set to a constant height and the shape conditions by various combinations of a width and a pitch are displayed at a position corresponding to a phase-dispersion at the center wavelength. Design dimensions that may exhibit a desired performance at the desired location may be selected within the map. In the case of introducing a height variation, a plurality of phase-dispersion maps having different height conditions may be set and overlapped, for example, a range for selecting the shape of the nanostructure $NS_k$ may be increased. In this way, the shape and arrangement of the nanostructures $NS_k$ may be determined to freely control chromatic aberration while widening the focusing wavelength band.

In FIG. 16, heights H, widths w, and pitches p of the plurality of nanostructures $NS_k$ are randomly illustrated, but embodiments are not limited thereto. For each of the plurality of regions 221_k, a predetermined rule may be set and applied to the height H, the width w, and the pitch p.

Figure 18:
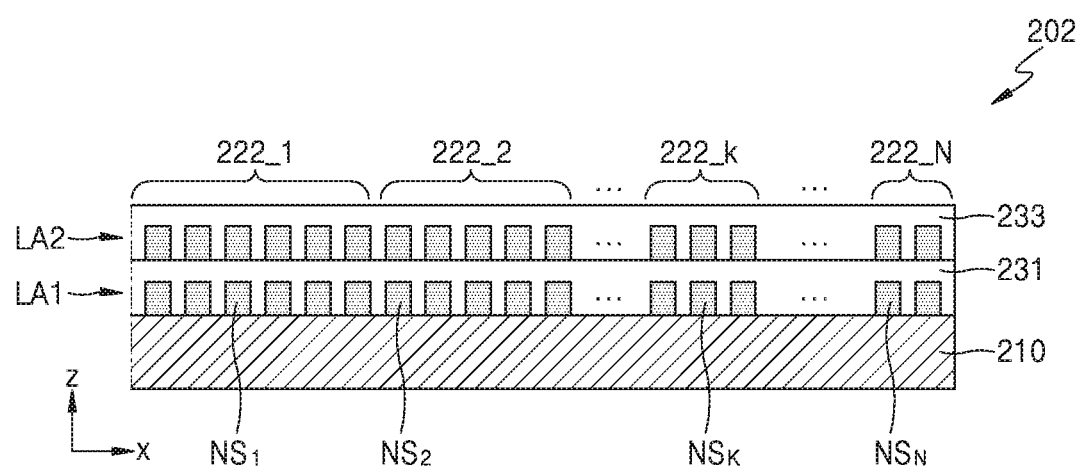
FIG. 18 is a cross-sectional view of a schematic structure of an optical device according to another exemplary embodiment.

FIG. 18 is a cross-sectional view showing a schematic structure of an optical device 202 according to another exemplary embodiment.

Similar to FIG. 16, FIG. 18 is a view corresponding to a cross-sectional view taken along line AA in the plan view of FIG. 14. The optical device 202 may include a first region 222_1, a second region 222_2, . . . and an N-th region 222_N. The optical device 202 may define an arrangement rule of nanostructures $NS_k$ in each of the first region 222_1 and the second region 222_2 to the N-th region 222_N to exhibit refractive power with respect to light of a predetermined wavelength band.

In the optical device 202 according to the exemplary embodiment, the plurality of nanostructures $NS_k$ included in the first region 222_1, the second region 222_2, . . . and the N-th region 222_N are arranged in a multi-layer structure. The multi-layer structure may include, for example, a first layer LA1 and a second layer LA2. The plurality of nanostructures $NS_k$ may include a plurality of lower nanostructures constituting the first layer LA1 and a plurality of upper nanostructures constituting the second layer LA2.

The first layer LA1 and the second layer LA2 may be separated in a height direction (Z direction). In order to form the first layer LA1 and the second layer LA2, a low refractive index material layer 231 including a material having a refractive index that is lower than the refractive index of the lower nanostructures and covering the plurality of lower nanostructures may be formed, and a plurality of upper nanostructures may be arranged on the low refractive index material layer 231. In order to cover and protect the plurality of upper nanostructures, a protective layer 233 including a material having a refractive index that is lower than the refractive index of the upper nanostructures may further be provided. The low refractive index protective layer 233 may be omitted.

Figure 19:
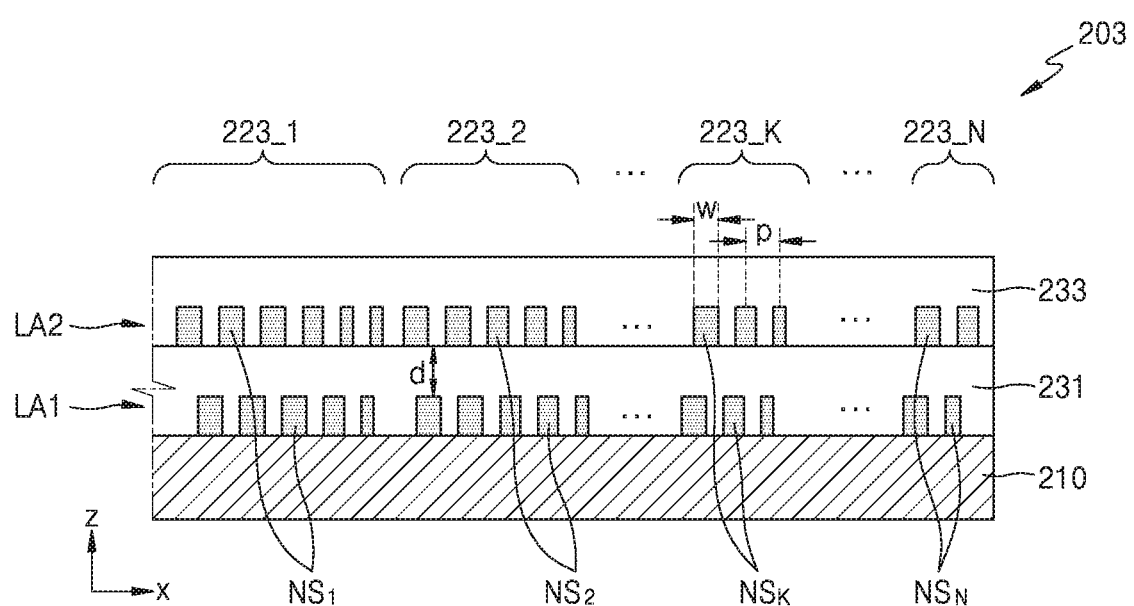
FIG. 19 is a cross-sectional view of a schematic structure of an optical device according to another exemplary embodiment.

FIG. 19 is a cross-sectional view of a schematic structure of an optical device 203 according to another exemplary embodiment.

Similar to FIG. 16, FIG. 19 is also a view corresponding to a cross-sectional view taken along line AA in the plan view of FIG. 14. The optical device 203 may include a first region 223_1, a second region 223_2, and an N-th region 223_N. The optical device 203 may define an arrangement rule of nanostructures $NS_k$ in each of the first region 223_1, the second region 223_2, . . . and the N-th region 223_N to exhibit refractive power with respect to light of a predetermined wavelength band.

The optical device 203 according to the exemplary embodiment is different from the optical devices 200 and 201 in that a plurality of nanostructures $NS_k$ included in the first region 223_1, the second region 223_2, . . . and the N-th region 223_N are arranged in a plurality of layers. The plurality of nanostructures $NS_k$ may be classified into a plurality of lower nanostructures constituting a first layer LA1 and a plurality of upper nanostructures constituting a second layer LA2.

The first layer LA1 and the second layer LA2 are separated in a height direction (Z direction). In order to form the first layer LA1 and the second layer LA2, a low refractive index material layer 231 including a material having a refractive index that is lower than a refractive index of the lower nanostructures and covering the plurality of lower nanostructures may be formed, and a plurality of upper nanostructures may be arranged on the low refractive index material layer 231. In order to cover and protect the plurality of upper nanostructures, a protective layer 233 including a material having a refractive index that is lower than a refractive index of the upper nanostructures may further be provided. The low refractive index protective layer 233 may be omitted.

The lower nanostructures constituting the first layer LA1 and the upper nanostructures constituting the second layer LA2 may be arranged to face each other in an offset manner. For example, central axes of at least some of the upper nanostructures and the lower nanostructures facing each other may not match with each other, however, not all of the lower nanostructures and the upper nanostructures that are facing each other may be arranged in an offset manner from each other.

A distance d between the lower nanostructures and the upper nanostructures of the plurality of lower nanostructures and the plurality of upper nanostructures, for example, a separation distance in the height direction (Z direction) may be greater than $\lambda/2$ with respect to the wavelength $\lambda$, within the predetermined wavelength band.

Based on the nanostructures $NS_k$ being arranged in a plurality of layers may reduce the possibility of performance degradation that may occur at some locations even if the shape of each of the nanostructures $NS_k$ is set to match with the desired target phase. This will be described with reference to FIGS. 17, 20, and 21.

Figure 20:
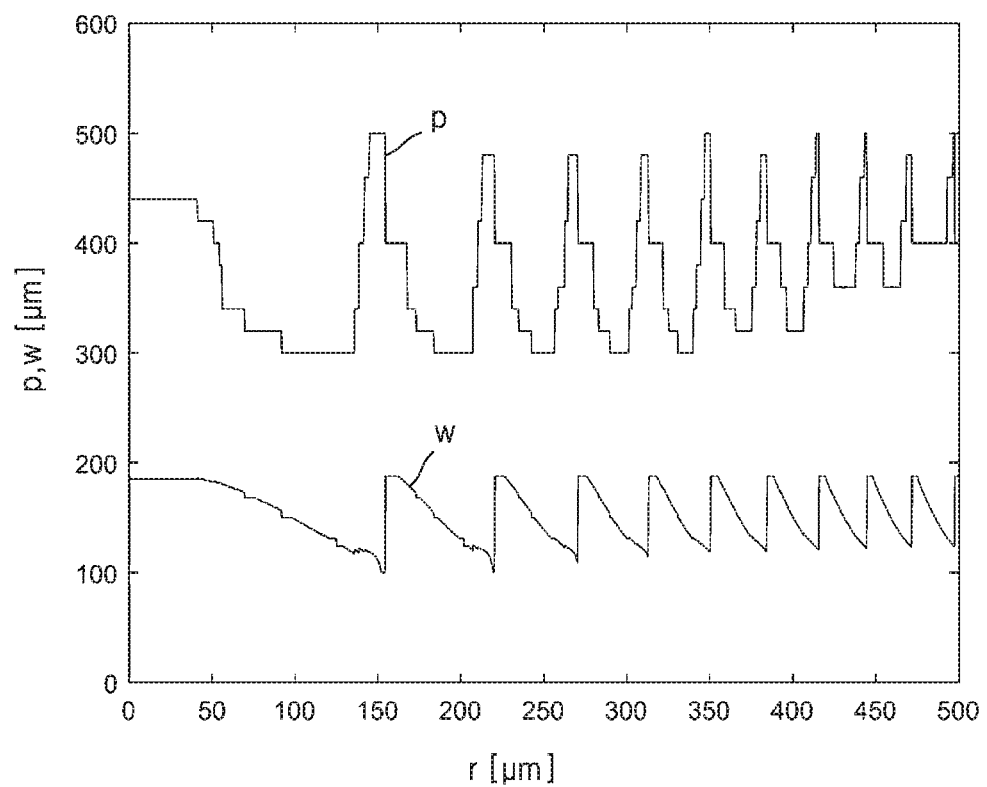
FIG. 20 shows example design data of a width and a pitch of positions of lower nanostructures arranged in a first layer in the optical device of FIG. 19.

As illustrated in FIG. 17, the target phase in each region may also be applied to the optical device 203 of FIG. 19. For example, the size and arrangement of the nanostructures $NS_k$ arranged in a two-layer structure in the plurality of regions 223_k of the optical device 203 may be set to satisfy the target phase as shown in FIG. 17 for each of the plurality of regions. FIG. 20 shows example design data of a width w and a pitch p of positions of the nanostructures $NS_k$ arranged in the first layer LA1 in the optical device 203 of FIG. 19.

Figure 21:
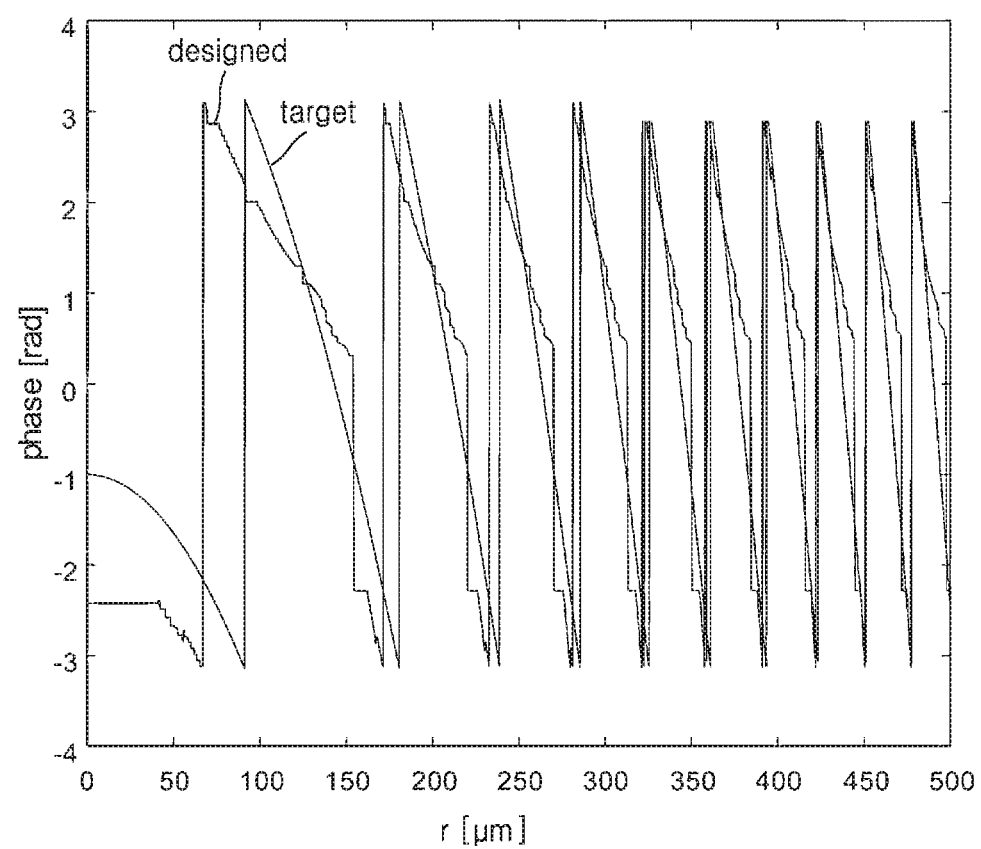
FIG. 21 is a graph showing comparison between a target phase value and phase values by nanostructures designed as shown in FIG. 20.

FIG. 21 is a graph showing comparison between a target phase value and phase values by nanostructures $NS_k$ designed as shown in FIG. 20. In the graph, a graph of a target phase value is indicated as 'target', and a graph of a phase value by the nanostructures $NS_k$ designed to implement the target phase value is indicated as 'designed'. As illustrated in FIG. 21, the two graphs do not completely match but have errors, and also, the degree of inconsistency is different depending on positions.

Figure 22:
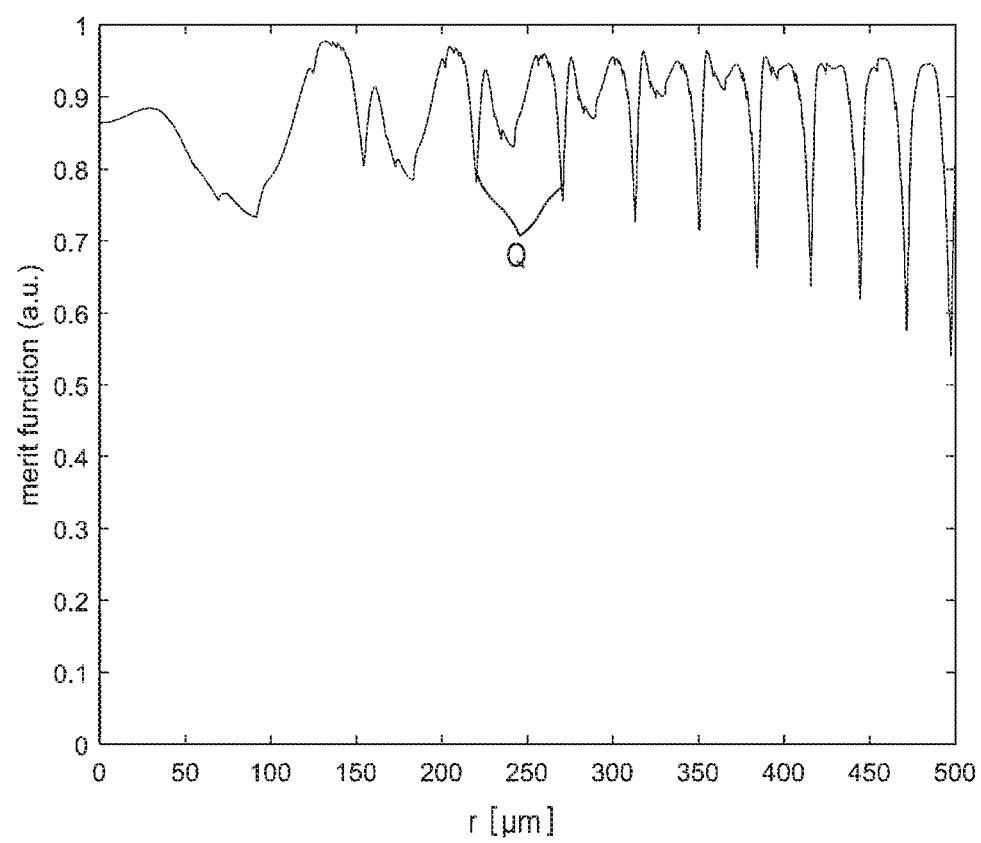
FIG. 22 is a graph showing a performance index obtained by quantifying a difference between the target value and the design value shown in FIG. 21.

FIG. 22 is a graph showing a performance index representing a difference between a target value and a designed value shown in FIG. 21. The performance index is numerically calculated for each position in a radial direction by integrating the degree of correlation between a target transmittance, transmission intensity and transmission phase, and an actual transmittance in an entire wavelength band under consideration. The graphs may be merit functions. The closer to 1 a number appearing on the vertical axis of the graph is the better the correlation, and a position where the degree of correlation is the lowest may be seen from points Q downwardly indicating polar point.

Figure 23:
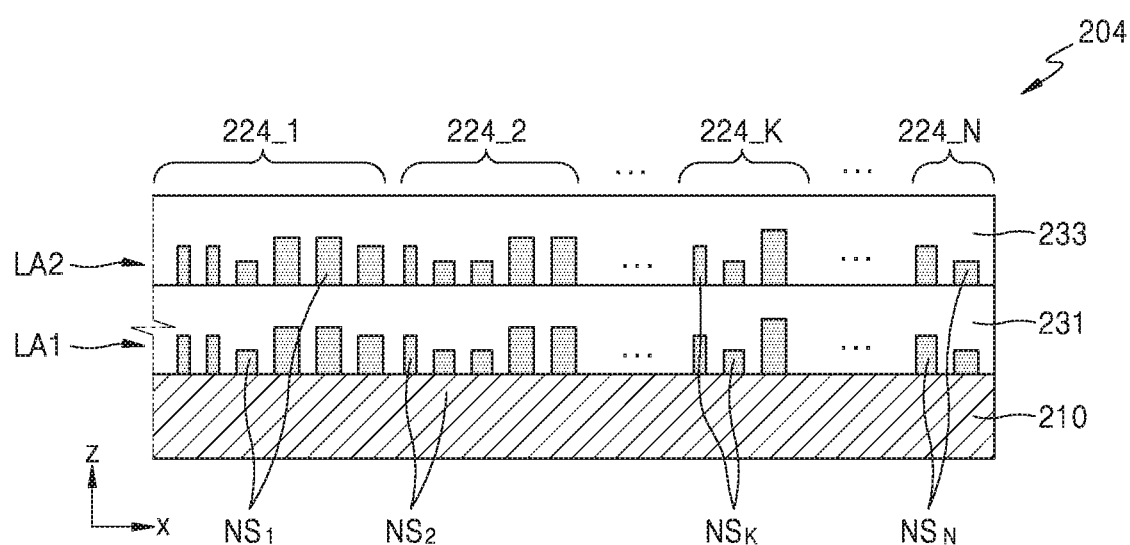
FIG. 23 is a cross-sectional view of a schematic structure of an optical device according to another exemplary embodiment.

FIG. 23 is a cross-sectional view of a schematic structure of an optical device 204 according to another exemplary embodiment.

The optical device 204 may include a first region 224_1, a second region 224_2, . . . and an N-th region 224_N. The optical device 204 may define an arrangement rule of nanostructures $NS_k$ in each of the first region 224_1, the second region 224_2, . . . and the N-th region 224_N to exhibit refractive power with respect to light of a predetermined wavelength band.

In the exemplary embodiment, among the plurality of nanostructures $NS_k$ constituting the first layer LA1 of the optical element 204, at least two of the nanostructures $NS_k$ included in the same region may have different heights from each other. Also, among the plurality of nanostructures $NS_k$ constituting the second layer LA2 of the optical device 204, at least two nanostructures $NS_k$ included in the same region may have different heights from each other. As described in the embodiment described with reference to FIG. 16, it is more easy to set a design value that may implement an appropriate phase dispersion at each position by applying a height variation. In particular, when it is needed to mutually compensate for performance degradation of each layer by introducing a plurality of nanostructure $NS_k$ arrays, it may be easier to select a design value of the nanostructures $NS_k$ that compensate for the performance degradation of the nanostructure $NS_k$ located at the position of another layer corresponding to the position of low correlation in a layer. Also, a more effective mutual compensation for phase and dispersion performance between layers may be possible.

In FIG. 23, it is depicted that nanostructures $NS_k$ of various heights are applied to both the first layer LA1 and the second layer LA2, but embodiments are not limited thereto. For example, in one of the first layer LA1 and the second layer LA2, the nanostructures $NS_k$ may be arranged at a constant height, and in another layer, nanostructures $NS_k$ having different heights may be selected at appropriate positions as needed. Also, although a plurality of layers are illustrated in all regions 224_k, embodiments are not limited thereto. A parameter for determining a rule to be applied to each region 224_k may include a plurality of layers or a height variation.

Figure 24:
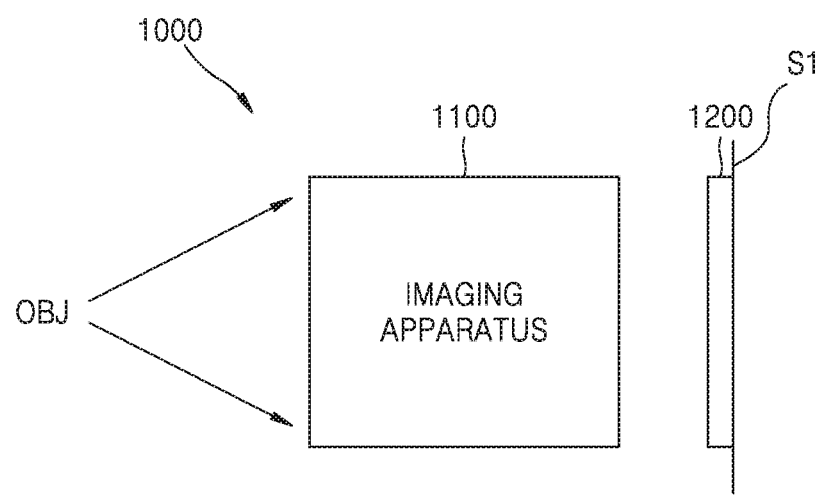
FIG. 24 is a view of an image system according to an exemplary embodiment.

FIG. 24 is a view of an image system 1000 according to an exemplary embodiment.

Referring to FIG. 24, the image system 1000 according to an exemplary embodiment may include the imaging apparatus 1100 and a light measurer 1200 provided to correspond to the imaging apparatus 1100.

The description of the imaging apparatus 100 made with reference to FIGS. 2 through 23 may apply to the imaging apparatus 100 of FIG. 24. The light measurer 1200 may be provided on the image plane S1 of the imaging apparatus 100. The light measurer 1200 may measure light focused by the imaging apparatus 100. The light measurer 1200 may include a plurality of light systems. As the number of the light systems included in the light measurer 1200 increases, a resolution of an image output from the light measurer 1200 may increase. The light system may be a pixel array of a complementary metal-oxide-semiconductor (CMOS) image sensor (CIS) using a charge-coupled device (CCD) or a CMOS. Alternatively, the light sensor may be a photodiode sensor.

Figure 25:
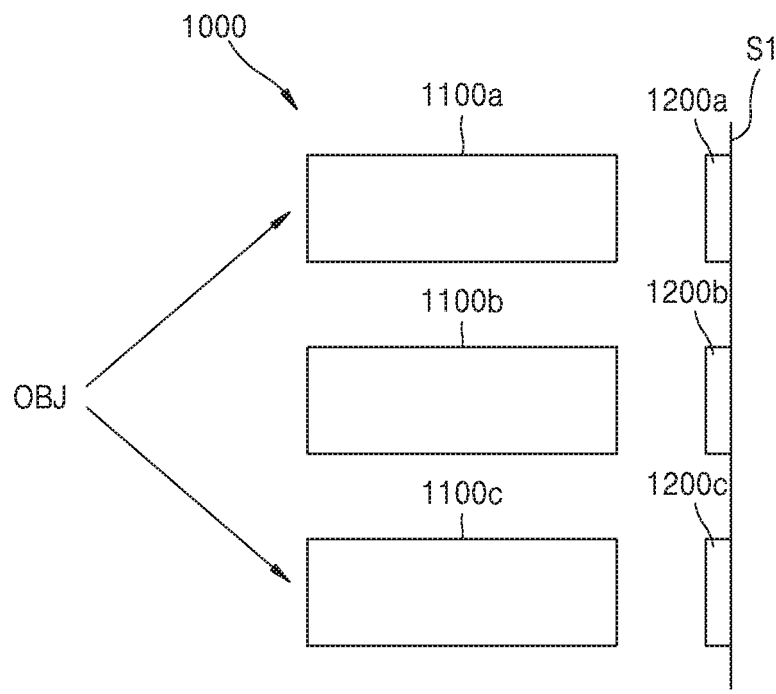
FIG. 25 is a view of the image system according to an exemplary embodiment.

FIG. 25 is a view of the image system 1000A according to an exemplary embodiment.

Referring to FIG. 25, the image system 1000A according to an exemplary embodiment may include a plurality of imaging apparatuses, for example, first through third imaging apparatuses 1100a, 1100b, and 1100c. At least two of the first through third imaging apparatuses 1100a, 1100b, and 1100c may have different operating wavelengths. That is, at least two of the first through third imaging apparatuses 1100a, 1100b, and 1100c may concentrate light having different wavelengths so that the light having different wavelengths are directed to the image plane S1. Also, each of the first through third imaging apparatuses 1100a, 1100b, and 1100c may include an optical filter for filtering light having wavelengths other than an operating wavelength range from among incident light.

For example, the first imaging apparatus 1100a may focus red light, the second imaging apparatus 1100b may focus blue light, and the third imaging apparatus 1100c may focus green light. However, the present exemplary embodiment is not limited thereto, and operating wavelengths of the imaging apparatuses 1100a, 1100b, and 1100c may be set in other ways. Also, all of the first through third imaging apparatuses 1100a, 1100b, and 1100c may have different operating wavelengths, or some of the first through third imaging apparatuses 1100a, 1100b, and 1100c may have the same operating wavelength.

The image system 1000A may include a plurality of light measurers 1200a, 1200b, and 1200c provided to respectively correspond to the first through third imaging apparatuses 1100a, 1100b, and 1100c. The light measurers 1200a, 1200b, and 1200c may be provided on the image planes Si of the first through third imaging apparatuses 1100a, 1100b, and 1100c and may generate images of an object OBJ by measuring light focused by the imaging apparatuses 1100a, 1100b, and 1100c.

The imaging apparatus 1100 and the image system 1000 including the imaging apparatus 1100 according to the one or more exemplary embodiments have been described with reference to FIGS. 1 through 23 As described above, since at least one of the first through third optical devices 110, 120, and 130 of the imaging apparatus 100 is a thin-lens including nanostructures, a thickness of the imaging apparatus 100 may be reduced. Also, chromatic aberration and geometric aberration of the imaging apparatus 100 may be reduced.

Since the imaging apparatus 1100 and the image system 1000 according to the one or more embodiments may be easily made compact, the imaging apparatus 1100 and the image system 1000 may be applied to a camera requiring a small pixel and a high resolution. Also, the imaging apparatus 100 and the image system 1000 may be applied to a pixel array of a color image system for a light field 3D camera requiring a lot of pixel information. Also, the imaging apparatus 100 and the image system 1000 may be applied to a system array for hyperspectral imaging. In addition, the imaging apparatus 1100 and the image system 1000 may be included in an optical bio-system such as a blood pressure system or a heart rate system using a spectrometer.

While one or more exemplary embodiments have been described with reference to the figures, it will be understood by those of ordinary skill in the art that various changes in form and details may be made therein without departing from the spirit and scope as defined by the following claims.

What is claimed is:

1. An imaging apparatus comprising:
   a first optical device configured to transmit light;
   a second optical device configured to transmit the light transmitted through the first optical device that is incident on the second optical device; and
   a third optical device disposed such that the light transmitted through the second optical device is incident on the third optical device,
   wherein at least one of the first optical device, the second optical device, and the third optical device comprises a plurality of nanostructures, and heights of at least two nanostructures of the plurality of nanostructures are different from each other,
   wherein the first optical device is a refractive optical lens, and each of the second optical device and the third optical device is a thin lens comprising the plurality of nanostructures, and
   wherein the plurality of nanostructures of the second optical device and the plurality of nanostructures of the third optical device are configured to offset a chromatic aberration of the second optical device and a chromatic aberration of the third optical device with each other.

2. The imaging apparatus of claim 1, wherein a difference in the heights of the at least two nanostructures is equal to or less than $2\lambda$, and
   wherein $\lambda$ is a wavelength of the light.

3. The imaging apparatus of claim 1, wherein the heights of the at least two nanostructures is equal to or greater than $\lambda/2$ and equal to or less than $3\lambda$, and
   wherein $\lambda$ is a wavelength of the light.

4. The imaging apparatus of claim 1, wherein the plurality of nanostructures are disposed in a multilayer structure.

5. The imaging apparatus of claim 4, wherein the multilayer structure comprises a first layer and a second layer, and the plurality of nanostructures comprise a plurality of lower nanostructures included in the first layer and a plurality of upper nanostructures included in the second layer.

6. The imaging apparatus of claim 5, wherein the plurality of lower nanostructures and the plurality of upper nanostructures are disposed to face each other, and a central axis of at least one of the plurality of lower nanostructures and a central axis of at least one of the plurality of upper nanostructures are offset.

7. The imaging apparatus of claim 5, wherein a distance between the plurality of lower nanostructures and the plurality of upper nanostructures in a height direction is greater than $\lambda/2$, and
   wherein $\lambda$ is a wavelength of the light.

8. The imaging apparatus of claim 5, wherein a shape distribution of the plurality of lower nanostructures and a shape distribution of the plurality of upper nanostructures are determined such that a performance index for each location of the imaging apparatus is different from all other performance indices of all other locations of the imaging apparatus, and wherein the shape distribution comprises a shape, a width, a height, and an arrangement of each of the plurality of nanostructures.

9. An imaging apparatus comprising:
a first optical device configured to transmit light
a second optical device configured to transmit the light transmitted through the first optical device that is incident on the second optical device; and
a third optical device disposed such that the light transmitted through the second optical device is incident on the third optical device,
wherein at least one of the first optical device, the second optical device, and the third optical device comprises a plurality of nanostructures, and heights of at least two nanostructures of the plurality of nanostructures are different from each other,
wherein the plurality of nanostructures are disposed in a multilayer structure,
wherein the multilayer structure comprises a first layer and a second layer, and the plurality of nanostructures comprise a plurality of lower nanostructures included in the first layer and a plurality of upper nanostructures included in the second layer,
wherein a shape distribution of the plurality of lower nanostructures and a shape distribution of the plurality of upper nanostructures are determined such that a performance index for each location of the imaging apparatus is different from all other performance indices of all other locations of the imaging apparatus,
wherein the shape distribution comprises a shape, a width, a height, and an arrangement of each of the plurality of nanostructures, and
wherein the shape distribution of the plurality of lower nanostructures and the shape distribution of the plurality of upper nanostructures are determined such that non-uniformity of focusing performances for locations of the imaging apparatus compensate each other.

10. The imaging apparatus of claim 1, wherein at least two nanostructures of the plurality of nanostructures have widths that are different from each other.

11. The imaging apparatus of claim 1, wherein the first optical device is configured to offset at least one of a geometric aberration and the chromatic aberration of at least one of the second optical device and the third optical device.

12. The imaging apparatus of claim 1, wherein each of the plurality of nanostructures comprises at least one material selected from a group consisting of crystalline silicon (c-Si), polycrystalline silicon (p-Si), amorphous silicon (a-Si), III-V compound semiconductors, SiC, $TiO_2$, and SiN.

13. An image system comprising:
at least one imaging apparatus; and
at least one light measurer corresponding, respectively, to each imaging apparatus of the at least one imaging apparatus, each light measurer of the at least one light measurer being configured to measure light incident on an image plane of a corresponding imaging apparatus of the at least one imaging apparatus,
wherein the at least one imaging apparatus comprises a first optical device configured to transmit light, a second optical device configured to transmit the light transmitted through the first optical device that is incident on the second optical device, and a third optical device disposed such that the light transmitted through the second optical device is incident on the third optical device,
wherein at least one of the first optical device, the second optical device, and the third optical device comprises a plurality of nanostructures, and at least two nanostructures of the plurality of nanostructures have heights that are different from each other,
wherein the first optical device is a refractive optical lens, and each of the second optical device and the third optical device is a thin lens comprising the plurality of nanostructures, and
wherein the plurality of nanostructures of the second optical device and the plurality of nanostructures of the third optical device are configured to offset a chromatic aberration of the second optical device and a chromatic aberration of the third optical device with each other.

14. The image system of claim 13, wherein a difference in the heights of the at least two nanostructures is less than or equal to $2\lambda$, and
wherein $\lambda$ is a wavelength of the light.

15. The image system of claim 13, wherein a height of each of the at least two nanostructures is equal to or great than $\lambda/2$ and equal to or less than $3\lambda$, and
wherein $\lambda$ is a wavelength of the light.

16. The image system of claim 13, wherein the plurality of nanostructures are disposed in a multilayer structure.

17. The image system of claim 16, wherein the multilayer structure comprises a first layer and a second layer, and
wherein the plurality of nanostructures comprise a plurality of lower nanostructures included in the first layer and a plurality of upper nanostructures included in the second layer.

18. The image system of claim 17, wherein the plurality of lower nanostructures and the plurality of upper nanostructures are disposed to face each other, and a central axis of at least one of the plurality of lower nanostructures and a central axis of at least one of the plurality of upper nanostructures are offset.

19. The image system of claim 17, wherein a distance between the plurality of lower nanostructures and the plurality of upper nanostructures in a height direction is greater than $\lambda/2$, and
wherein $\lambda$ is a wavelength of the light.

20. The image system of claim 17, wherein a shape distribution of the plurality of lower nanostructures and a shape distribution of the plurality of upper nanostructures are determined such that a performance index for each location of the imaging apparatus is different from all other performance indices of all other locations of the imaging apparatus, and wherein the shape distribution comprises a shape, a width, a height, and an arrangement of each of the plurality of nanostructures.

21. An image system comprising:
at least one imaging apparatus; and
at least one light measurer corresponding, respectively, to each imaging apparatus of the at least one imaging apparatus, each light measurer of the at least one light measurer being configured to measure light incident on an image plane of a corresponding imaging apparatus of the at least one imaging apparatus,
wherein the at least one imaging apparatus comprises a first optical device configured to transmit light, a second optical device configured to transmit the light transmitted through the first optical device that is incident on the second optical device, and a third optical device disposed such that the light transmitted through the second optical device is incident on the third optical device, wherein at least one of the first optical device, the second optical device, and the third optical device comprises a plurality of nanostructures, and at least two nanostructures of the plurality of nanostructures have heights that are different from each other, wherein the plurality of nanostructures are disposed in a multilayer structure, wherein the multilayer structure comprises a first layer and a second layer, wherein the plurality of nanostructures comprise a plurality of lower nanostructures included in the first layer and a plurality of upper nanostructures included in the second layer, wherein a shape distribution of the plurality of lower nanostructures and a shape distribution of the plurality of upper nanostructures are determined such that a performance index for each location of the imaging apparatus is different from all other performance indices of all other locations of the imaging apparatus, wherein the shape distribution comprises a shape, a width, a height, and an arrangement of each of the plurality of nanostructures, and wherein the shape distribution of the plurality of lower nanostructures and the shape distribution of the plurality of upper nanostructures are determined such that non-uniformity of focusing performances for locations of the at least one imaging apparatus compensate each other.

22. The image system of claim 13, wherein at least two nanostructures of the plurality of nanostructures have widths that are different from each other.

* * * * *